United States Patent
Poole

(10) Patent No.: US 8,667,465 B2
(45) Date of Patent: Mar. 4, 2014

(54) SYSTEM FOR ESTIMATING A SOFTWARE PRODUCT RELEASE TIME FROM VERSION INFORMATION

(75) Inventor: Damon B. Poole, Westford, MA (US)

(73) Assignee: AccuRev, Inc., Concord, MA (US)

( * ) Notice: Subject to any disclaimer, the term of this patent is extended or adjusted under 35 U.S.C. 154(b) by 1498 days.

(21) Appl. No.: 12/059,529

(22) Filed: Mar. 31, 2008

(65) Prior Publication Data

US 2009/0249295 A1    Oct. 1, 2009

(51) Int. Cl.
*G06F 9/44*    (2006.01)

(52) U.S. Cl.
USPC .......................... 717/122; 717/120; 717/121

(58) Field of Classification Search
None
See application file for complete search history.

(56) References Cited

U.S. PATENT DOCUMENTS

| | | | |
|---|---|---|---|
| 4,558,413 A * | 12/1985 | Schmidt et al. | 717/170 |
| 4,809,170 A | 2/1989 | Leblang et al. | |
| 5,278,979 A * | 1/1994 | Foster et al. | 1/1 |
| 5,421,008 A | 5/1995 | Banning et al. | |
| 5,428,737 A | 6/1995 | Li et al. | |
| 5,428,776 A | 6/1995 | Rothfield | |
| 5,553,282 A * | 9/1996 | Parrish et al. | 1/1 |
| 5,600,834 A | 2/1997 | Howard | |
| 5,649,200 A | 7/1997 | Leblang et al. | |
| 5,659,735 A * | 8/1997 | Parrish et al. | 1/1 |
| 5,721,900 A | 2/1998 | Banning et al. | |
| 5,752,245 A * | 5/1998 | Parrish et al. | 1/1 |
| 5,884,306 A | 3/1999 | Bliss et al. | |
| 5,903,897 A * | 5/1999 | Carrier et al. | 1/1 |
| 5,909,689 A * | 6/1999 | Van Ryzin | 1/1 |
| 5,913,063 A | 6/1999 | McGurrin et al. | |
| 5,956,513 A * | 9/1999 | McLain, Jr. | 717/142 |
| 6,003,034 A | 12/1999 | Tuli | |
| 6,055,544 A | 4/2000 | DeRose et al. | |
| 6,098,073 A | 8/2000 | O'Rourke | |
| 6,112,024 A * | 8/2000 | Almond et al. | 717/122 |
| 6,216,140 B1 | 4/2001 | Kramer | |
| 6,247,047 B1 | 6/2001 | Wolff | |
| 6,256,773 B1 * | 7/2001 | Bowman-Amuah | 717/121 |

(Continued)

OTHER PUBLICATIONS

Poole, Damon and John Posner. "Stream-Based Architecture for SCM" Jun. 6, 2005 AccuRev. <http://www.accurev.com/whitepaper/pdf/accurev_streams.pdf> 16 pages.*

(Continued)

*Primary Examiner* — Thuy Dao
*Assistant Examiner* — Samuel Hayim
(74) *Attorney, Agent, or Firm* — Wolf, Greenfield & Sacks, P.C.

(57) ABSTRACT

Systems and processes for migration of data stored in a label-based software configuration management (CM) system to records of a time-based CM system in a manner that permits for identification, in the time-based system, of contents of releases. In some exemplary implementations, techniques operating according to some of the principles described herein will accept as input information relating to a listing of a label-based system and estimate, based on the software component versions in the listing and their corresponding creation times, a release time indicating a time a release was created. The release time may then be used, in some, but not necessarily all, implementations to create a data structure in the time-based system indicating contents of the version at the particular time. Some exemplary implementations may additionally determine, from the estimated release time, whether any software component versions should be explicitly included or excluded from the data structure.

37 Claims, 10 Drawing Sheets

(56) References Cited

U.S. PATENT DOCUMENTS

| | | | |
|---|---|---|---|
| 6,272,678 B1 | 8/2001 | Imachi et al. | |
| 6,405,364 B1* | 6/2002 | Bowman-Amuah | 717/120 |
| 6,438,743 B1* | 8/2002 | Boehm et al. | 717/122 |
| 6,457,170 B1* | 9/2002 | Boehm et al. | 717/120 |
| 6,487,713 B1 | 11/2002 | Cohen et al. | |
| 6,493,732 B2 | 12/2002 | Aoyama et al. | |
| 6,502,133 B1 | 12/2002 | Baulier et al. | |
| 6,557,012 B1 | 4/2003 | Arun et al. | |
| 6,564,369 B1* | 5/2003 | Hove et al. | 717/121 |
| 6,626,953 B2* | 9/2003 | Johndrew et al. | 715/234 |
| 6,662,357 B1* | 12/2003 | Bowman-Amuah | 717/120 |
| 6,681,382 B1* | 1/2004 | Kakumani et al. | 717/122 |
| 6,715,108 B1 | 3/2004 | Badger et al. | |
| 6,766,334 B1 | 7/2004 | Kaler et al. | |
| 6,789,252 B1* | 9/2004 | Burke et al. | 717/100 |
| 6,901,407 B2* | 5/2005 | Curns et al. | 1/1 |
| 6,978,281 B1 | 12/2005 | Kruy et al. | |
| 7,089,552 B2* | 8/2006 | Atallah | 717/175 |
| 7,146,608 B1* | 12/2006 | Newman et al. | 717/168 |
| 7,251,655 B2 | 7/2007 | Kaler et al. | |
| 7,289,973 B2 | 10/2007 | Kiessig et al. | |
| 7,437,722 B2 | 10/2008 | Poole | |
| 7,614,038 B2 | 11/2009 | Poole | |
| 7,769,787 B2 | 8/2010 | Hailpern et al. | |
| 7,856,615 B2 | 12/2010 | Clemm et al. | |
| 8,032,573 B2 | 10/2011 | Richard | |
| 2001/0049697 A1* | 12/2001 | Johndrew et al. | 707/500 |
| 2002/0062475 A1 | 5/2002 | Iborra et al. | |
| 2002/0091990 A1 | 7/2002 | Little et al. | |
| 2002/0107840 A1 | 8/2002 | Rishe | |
| 2003/0051230 A1* | 3/2003 | Molchanov et al. | 717/120 |
| 2003/0126003 A1 | 7/2003 | vom Scheidt et al. | |
| 2003/0200098 A1* | 10/2003 | Geipel et al. | 717/121 |
| 2004/0015842 A1 | 1/2004 | Nanivadekar et al. | |
| 2004/0044996 A1* | 3/2004 | Atallah | 717/169 |
| 2004/0056903 A1 | 3/2004 | Sakai et al. | |
| 2004/0260693 A1 | 12/2004 | Chen et al. | |
| 2005/0086588 A1 | 4/2005 | McGregor et al. | |
| 2005/0114479 A1 | 5/2005 | Watson-Luke | |
| 2006/0015851 A1* | 1/2006 | Poole | 717/120 |
| 2006/0031811 A1 | 2/2006 | Ernst et al. | |
| 2006/0070019 A1 | 3/2006 | Vishnumurty et al. | |
| 2006/0150148 A1 | 7/2006 | Beckett et al. | |
| 2006/0253588 A1 | 11/2006 | Gao et al. | |
| 2007/0011649 A1 | 1/2007 | Venolia | |
| 2007/0118888 A1 | 5/2007 | Styles | |
| 2008/0098037 A1 | 4/2008 | Neil et al. | |
| 2009/0307650 A1 | 12/2009 | Saraf et al. | |

OTHER PUBLICATIONS

"Agile: Branches vs. Streams", Dave on SCM, Sep. 26, 2007, <http://daveonscm.blogspot.com/>, pages 1-9.*

Bernhard Westfechtel et al., "A Layered Architecture for Uniform Version Management", IEEE, Dec. 2001, <http://ieeexplore.ieee.org/stamp/stamp.jsp?tp=&arnumber=988710>, pp. 1-23.*

Reidar Conradi, "Version Models for Software Configuration Management", ACM, 1998, <http://delivery.acm.org/10.1145/290000/280280/p232-conradi.pdf>, pp. 1-51.*

Office Action dated Aug. 31, 2010 from Co-pending U.S. Appl. No. 12/001,708.

Massari et al. "Supporting Mobile Database Access Through Query by Icons," Distributed and Parallel Databases, 4:249-269 (1996).

Office Action dated Mar. 4, 2010 from Co-Pending U.S. Appl. No. 12/001,708.

JIRA, JIRA User's Guide, 2002-2005, JIRA, http://www.atlassian.com/software/jira/docs/v3.13/jira-manual-user-pdf, p. 1-143.

JIRA, JIRA Documentation, 2002-2005, JIRA, http://www.usit.uio.no/prosjekter/gorilla/doku/jira-manual.pdf, p. 1-376.

Office Action dated Aug. 15, 2011 from Co-Pending U.S. Appl. No. 12/001,710.

Office Action dated Mar. 9, 2011 from Co-Pending U.S. Appl. No. 12/001,708.

Office Action dated Aug. 31, 2011 from Co-Pending U.S. Appl. No. 12/001,708.

Office Action from U.S. Appl. No. 12/551,923 dated Mar. 26, 2012.

Office Action from U.S. Appl. No. 12/001,710 dated May 11, 2012.

Leblang, "Managing the Software Development Process with ClearGuide" Pure Atria, Lexington, MA, USA, May 1997, p. 66-80.

Office Action from U.S. Appl. No. 12/551,923 dated Sep. 10, 2012.

* cited by examiner

SYSTEM FOR ESTIMATING A SOFTWARE PRODUCT RELEASE TIME FROM VERSION INFORMATION

BACKGROUND OF INVENTION

1. Field of Invention

This invention relates to the field of configuration management software for managing development of a software project. More particularly, it relates to a system and method for estimating a creation time for one or more versions of a software project based on input information regarding software component versions included in the one or more versions of the software project and creation times of the software component versions.

2. Discussion of Related Art

Developing software applications and products (which includes both initial development and later modifying or adding to the initial development) often requires the coordinated efforts of many developers (e.g., software programmers). This coordinated effort is referred to herein as a "software development effort" or "development effort," and a body of work (e.g., one or more software products, including software applications) being developed by the effort is referred to as a "software development project," "software project," or "project." A software development effort may comprise one or more software projects. At any given time, as part of a software development effort, multiple developers may be working on different software components of a software development project and/or different versions of these software components (e.g., for different users or situations). Thus, there may be multiple concurrent software development efforts ongoing, at least some of which use or involve the modification of common software components, including different versions of those software components and sometimes multiple versions of components.

Frequently, a software development project may involve several, or even dozens or more, of developers and managers, and from a few to even hundreds of software components. Managing one or more software development projects and the concurrent development of these different software components and versions is commonly referred to as configuration management (CM). Computers or computer systems running CM software applications (i.e., programs) assist developers and project managers in the complex task of managing a software development project, including maintaining coherency between different software components and versions. (Hereafter, the term "CM application" may be used to refer to such computers or computer systems, or to a CM program for executing on a computer or computer system.)

One popular, conventional way of managing projects of a software development effort is referred to herein as a "label-based system." Label-based CM applications (i.e., CM applications running in label-based systems) have long been in use in the field of software development, from the Revision Control System (RCS) proposed in 1985 through modern CM applications like Rational ClearCase available from the IBM Corporation of Armonk, N.Y.; Perforce, available from Perforce Software, Inc., of Alameda, Calif.; Concurrent Versions System (CVS), an open-source software project; PVCS available from Serena Software, Inc., of Redwood City, Calif.; and many others.

In a label-based system, information on software components and their versions is stored separately from project information. A developer, working on a project in a label-based system, may edit individual software components of a project (e.g., individual code files) and may create one or more versions of the software components. Information on these software component versions (i.e., the versions of the software components) is stored by the label-based system along with edit/creation times for the versions. This information on software component versions may, in some label-based systems, be stored in a tree/branch format describing a relationship between versions of the software components and versions of a software project.

A developer may store additional information (e.g., metadata) in the records of the label-based system describing the software components and/or software component versions which are to be included in a "build" or "release" of a software project, which is a version of a software project at a particular time. (Herein, where the term "release" is used, it should be understood to refer to both a "build" and a "release," and therefore does not require any distribution to inside or outside parties.) For example, if a developer, working on a "Version 2.0" of a software product, creates new versions of some software components while fixing bugs of and/or adding functionality to the "Version 1.0" of the software product, the developer may store as a part of the additional information an indication that the new versions of the software components are to be included in the "Version 2.0" release of the software product. Label-based systems typically only store a single copy of this additional information; that is, if a change is made to the additional information, any information predating the change is lost.

The additional information stored by the developer to describe a release may be used by the label-based system when a release is created to retrieve the appropriate software component versions to be included in the release, and may additionally be used to create a listing of software component versions which were included in the release. This listing may comprise the "label" of the label-based system as a field identifying the release. Once created, this listing may be perpetually stored by the label-based CM application as an indicator of the contents of the particular build of the contents of the particular release of the version of the software project, and may be stored in many ways, for example, as a table in a database. For example, the listing may comprise information such as an identifier for each software component included in the release, an identifier for the version of the software component, an identifier for the version of the software component, and a label for the release (e.g., "RELEASE1" or "Test-Build"). A user of a label-based system, as mentioned above, may then refer to the listing later to determine the state of a version of the software project at a time of the release (i.e., which software components and versions were included in the project).

Table I shows one example of such a listing of software components included in a release named RELEASE1.

TABLE I

| Software Component | Version | Label |
|---|---|---|
| foo.c | 1 | RELEASE1 |
| bar.c | 1 | RELEASE1 |

Table II shows a second example of such a listing, including information regarding two different releases.

TABLE II

| Software Component | Version | Label |
|---|---|---|
| foo.c | 1 | RELEASE1 |
| foo.c | 2 | RELEASE2 |
| bar.c | 1 | RELEASE1 |
| bar.c | 2 | RELEASE2 |
| other.c | 3 | RELEASE2 |

New systems have been proposed which move away from the label-based system model used by RCS, ClearCase, and others. One such new system is referred to herein as a "time-based system." An example of such a time-based system is AccuRev 4.5 available from AccuRev, Inc., of Lexington, Mass. Time-based systems are described in greater detail below, and more information is available in the disclosures of U.S. patent application Ser. Nos. 10/894,697 and 10/894,964, both by Damon B. Poole and both of which are incorporated herein by reference in their entireties. It should be appreciated that terminology explicitly employed herein that also may appear in either of the disclosures incorporated by reference should be accorded a meaning most consistent with the particular concepts disclosed herein.

In a time-based system such as AccuRev, information on versions of software projects may be maintained, indicating the software component versions that each version of the project comprises. Some systems may additionally store information on the parent or child versions with which the project versions share a relationship and a history of changes that have been made to the versions (e.g., software component versions which have been previously included in the version of the software project, but are not now, and the time the change was made). This history may be based on a time changes were made and/or a sequence of the transactions/operations that effected the changes. The information on the versions of the software projects may be stored in these time-based systems in many different ways, including as streams.

A "stream" is a data structure containing information describing a version of a software project (or other type of software entity) and a set of software components (i.e., one or more software components) associated with the version. A stream may relate a set of software components to one another and to metadata describing the version of the software development project and/or the software components. The metadata of a stream may be any suitable information about the software components and/or project, such as a status of the software components and/or a status of the project. It should be appreciated that different versions of a software project (or other type of software entity) may have the same content (e.g., may include a same set of software component versions) or different content.

The contents of a version of a software project (i.e., the software component versions of a version of a software project) in a time-based system may be determined in one or more ways. In some time-based systems, contents of a version are determined based on the version hierarchy in which the version is and inheritance properties of the hierarchy. For example, a child version may be considered to have all the contents of a parent version, but a parent version may not have all contents of a child version. Additionally or alternatively, a version's contents may be determined by include and/or exclude rules, stipulating which software components and/or software component versions are included in the software project version and/or which are excluded from the software project version. For example, an include rule may stipulate that all files of a particular directory in a software component file structure be included, and an exclude rule may stipulate that none of the files of subdirectories of that particular directory be included. In some time-based systems, a combination of inheritance and include/exclude rules may be implemented. Information on the contents of a version may be stored by the time-based system as a part of the information on the versions of the software projects (e.g., as the metadata of a stream).

The information on versions of software projects stored by a time-based system may provide developers the ability to determine a status of the version of the software project at various points in time. For example, by examining a history of changes made to the version, a developer may be able to determine contents of the version at a desired time. Additionally, in some systems, a developer may be able to create in the time-based system a record relating to the version that contains the contents of the version of the software project at a particular time, such as when a release is created. Such a record may be stored as a time-based version, including as a "snapshot," which may be an unchangeable time-based version (i.e., no changes may be made to it in the future). The time-based version may then be easily consulted later to determine the contents of the version at the time (e.g., the contents of the release), rather than examining a history of changes to the version and identifying a particular time and the contents at that time.

Time-based systems offer many advantages over label-based systems. First, while in label-based systems only the current state of a version (e.g., the current contents of the version) is maintained, in a time-based system a history of changes made to the version may permit developers to have more information about exactly what happened to a version at what time, and how the version has evolved over time. This information may help developers in troubleshooting problems, such as by aiding in identifying what changes were made to a version and when the changes were made. Additionally, by storing at all times the contents of a version of a software project, and maintaining a history of changes that may be reviewed later and/or a snapshot identifying a state of a version at a particular time, time-based systems avoid the necessity of creating a separate listing at release time indicating the contents of the release. While in small software projects the step of creating this separate listing may be trivial, in larger software projects of thousands of files this process can take hours and is a waste of system resources.

Applicant has appreciated that, given these advantages and others, developers using conventional, label-based systems may desire to migrate to a time-based system or to permit part of their development teams to perform time-based management of the software development process while integrating with other parts of the team using a label-based process. Applicant has further appreciated the desirability of a migration process permitting a transfer of historical software project information from the label-based system to the time-based systems, such that developers may still access previously-created data in the new time-based system.

SUMMARY OF INVENTION

Systems and processes operating according to some of the principles described herein provide functionality to allow for migration of data stored in records of a label-based system to records of a time-based system in a manner that permits identification, in the time-based system, of contents of releases. In some implementations, techniques operating according to some of the principles described herein will accept as input information relating to a listing (e.g., a label table) of a label-based system as described above and estimate, based on the software component versions in the listing and their corresponding creation times, a release time indicating a time a release was created. The release time may then be used, in some, but not necessarily all, implementations to create a data structure in the time-based system indicating contents of the version at the particular time. Some exemplary implementations may additionally determine, from the estimated release time, whether any software component versions should be explicitly included or excluded from the data structure, depending on whether the creation times were before or after the estimated time.

In one embodiment, there is provided a method for migrating a software project from a label-based system for use in a time-based system and determining which versions of software components to include in a version of the software project in the time-based system. The version of the software project comprises a plurality of said software components in some combination of versions of the software components. The method comprises examining a first set of software components and their versions included in the version of the software project and a second set of later versions of the software components included in the version of the software project to determine component creation times for each of the software component versions in the first set and the second set, and determining a creation time for the version of the software project by comparing the creation times for each software component which is present in both the first set of software components and the second set of software components. The method further comprises recording in a computer-readable data structure the creation time for the version of the software project, and determining if any software component versions included in the version of the software project in the label-based system were created after the creation time determined and, if so, recording in the data structure indications that the software component versions so determined are included in the version of the software project.

In another embodiment, there is provided a computer-implemented method for estimating a creation time for a version of a software product. The version comprises a plurality of software components and at least some of the software components are available in two or more versions with only one version of a software component included in a software product version. The method comprises determining a first set of software component versions and a second set of software component versions. The first set of software component versions comprises versions of software components which are included in the version of the software product and the second set of software components comprises later versions of the software components. The method further comprises examining the creation times of the software component versions of the first set and the second set to determine the creation time for the version of the software product by comparing the creation times for each software component which has a version in each of the first set and the second set, and selecting as the estimated creation time for the version of the software product that time which is the latest of the component creation times of versions of software components in the first set of software component versions which is not later than a component creation time of a corresponding version of the software component in the second set of software component versions.

In a further embodiment, there is provided at least one computer storage medium encoded with computer-executable instructions which, when executed, carry out a method for migrating a software project from a label-based system for use in a time-based system and determining which versions of software components to include in a version of the software project in the time-based system. The version of the software project comprises a plurality of said software components in some combination of versions of the software components. The method comprises examining a first set of software components and their versions included in the version of the software project and a second set of later versions of the software components included in the version of the software project to determine component creation times for each of the software component versions in the first set and the second set, and determining a creation time for the version of the software project by comparing the creation times for each software component which is present in both the first set of software components and the second set of software components. The method further comprises recording in a computer-readable data structure the creation time for the version of the software project, and determining if any software component versions included in the version of the software project in the label-based system were created after the creation time determined and, if so, recording in the data structure indications that the software component versions so determined are included in the version of the software project.

In another embodiment there is provided at least one computer storage medium encoded with computer-executable instructions which, when executed, carry out a method for estimating a creation time for a version of a software product. The version comprises a plurality of software components and at least some of the software components are available in two or more versions with only one version of a software component included in a software product version. The method comprises determining a first set of software component versions and a second set of software component versions. The first set of software component versions comprises versions of software components which are included in the version of the software product and the second set of software components comprises later versions of the software components. The method further comprises examining the creation times of the software component versions of the first set and the second set to determine the creation time for the version of the software product by comparing the creation times for each software component which has a version in each of the first set and the second set, and selecting as the estimated creation time for the version of the software product that time which is the latest of the component creation times of versions of software components in the first set of software component versions which is not later than a component creation time of a corresponding version of the software component in the second set of software component versions.

In a further embodiment, there is provided an apparatus comprising at least one computer storage medium encoded with computer-executable instructions which, when executed, carry out a method for migrating a software project from a label-based system for use in a time-based system and determining which versions of software components to include in a version of the software project in the time-based system. The version of the software project comprises a plurality of said software components in some combination of versions of the software components. The method comprises examining a first set of software components and their versions included in the version of the software project and a second set of later versions of the software components included in the version of the software project to determine component creation times for each of the software component versions in the first set and the second set, and determining a creation time for the version of the software project by comparing the creation times for each software component which is present in both the first set of software components and the second set of software components. The method further comprises recording in a computer-readable data structure the creation time for the version of the software project, and determining if any software component versions included in the version of the software project in the label-based system were created after the creation time determined and, if so, recording in the data structure indications that the software component versions so determined are included in the version of the software project. The apparatus further comprises at least one processor to execute the method.

In a further embodiment, there is provided an apparatus comprising at least one computer storage medium encoded with computer-executable instructions which, when executed, carry out a method for estimating a creation time for a version of a software product. The version comprises a plurality of software components and at least some of the software components are available in two or more versions with only one version of a software component included in a software product version. The method comprises determining a first set of software component versions and a second set of software component versions. The first set of software component versions comprises versions of software components which are included in the version of the software product and the second set of software components comprises later versions of the software components. The method further comprises examining the creation times of the software component versions of the first set and the second set to determine the creation time for the version of the software product by comparing the creation times for each software component which has a version in each of the first set and the second set, and selecting as the estimated creation time for the version of the software product that time which is the latest of the component creation times of versions of software components in the first set of software component versions which is not later than a component creation time of a corresponding version of the software component in the second set of software component versions. The apparatus further comprises at least one processor to execute the method.

In another embodiment, there is provided an apparatus comprising at least one computer storage medium encoded with computer-executable instructions which, when executed, carry out a method for migrating a software project from a label-based system for use in a time-based system and determining which versions of software components to include in a version of the software project in the time-based system. Each version of the software project comprises a plurality of said software components in some combination of versions of the software components. The method comprises examining a first set of software components and their versions included in the version of the software project and a second set of later versions of the software components included in the version of the software project to determine component creation times for each of the software component versions in the first set and the second set and recording in a data structure a creation time for the version of the software project. The method further comprises determining if any software component versions included in the version of the software project in the label-based system were created after the creation time and, if so, recording in the data structure indications that the software component versions so determined are included in the version of the software project. The apparatus further comprises at least one processor to execute the method and means for estimating the creation time for the software project by comparing the creation times for each software component which is present in both the first set of software components and the second set of software components.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
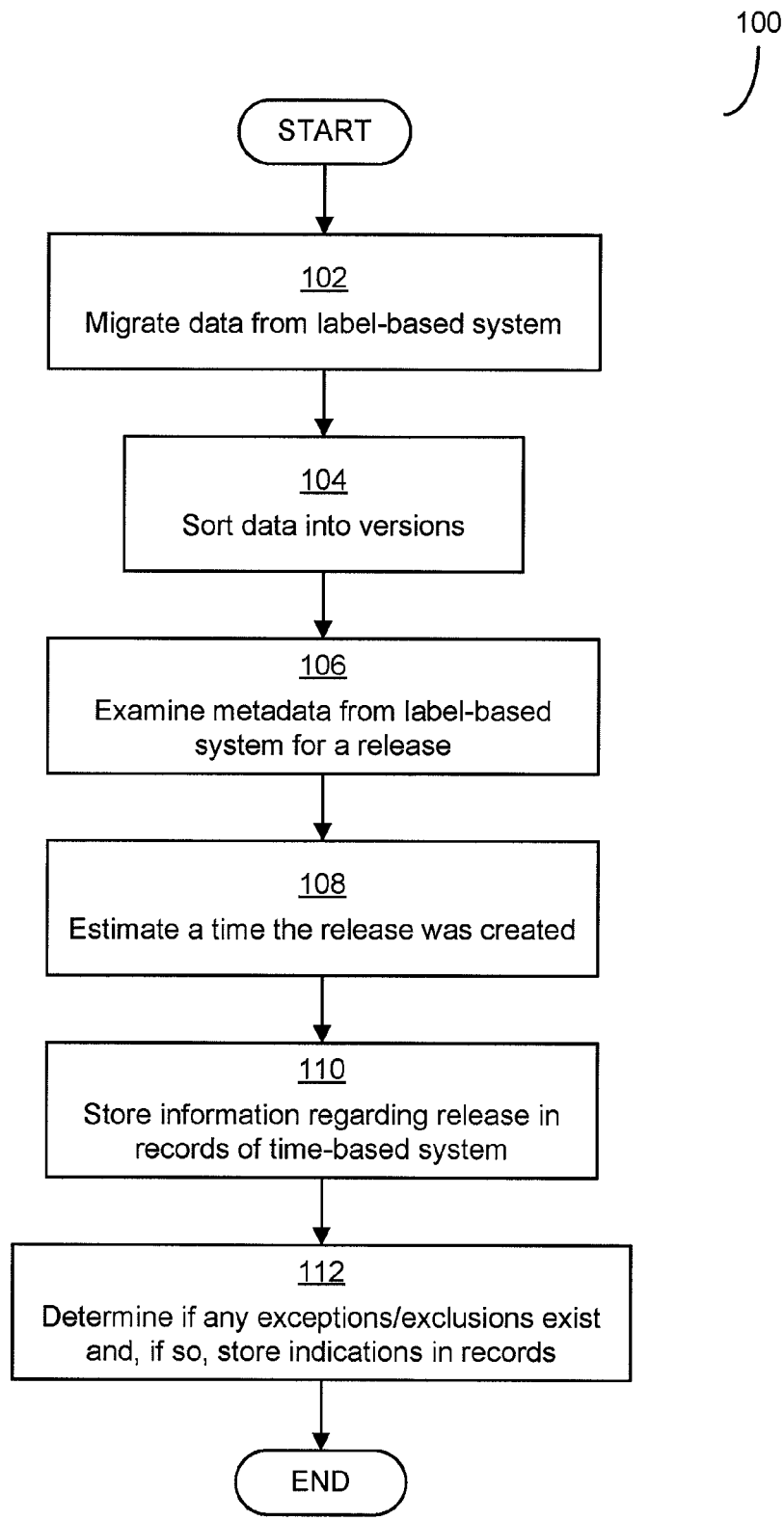
FIG. 1 is a flowchart of an exemplary process for determining contents of a release in a time-based system using information from a label-based system.

Pure migration of data from a label-based system to a time-based system—that is, copying the software components and their corresponding versions from one to the other—may be done in any number of ways and may be a very trivial process, particularly for smaller software development efforts. Some processes for performing this migration, however, may not take full advantage of the benefits of a time-based system, including the capability to store a history of changes made to versions of a software project and the ability to store a state of a software project version as a time-based version and/or as a snapshot.

For some users of CM applications, it may be desirable to migrate data in a manner that stores information in the time-based system that can be used to identify a history of the changes made a software project and a history of various states of the software project. However, label-based systems do not typically store such information, as discussed above, and so this information cannot simply be migrated and stored along with other data from the records of the label-based system. In label-based systems, the creation time for software component versions may be stored, which indicates the timing of at least the transactions that created the software component versions, but these times, by themselves, do not provide much information regarding transactions executed on a software project, such as the time a release was created. While a listing of the contents of a release is created at the time the release is created, many label-based systems do not store any time information for the creation of this release. Additionally, as discussed above, the creation of this listing may take hours in the case of large software projects, and time information that could be stored regarding the creation time of this listing may not be useful when seeking a description of the state of the software project at the time the release was created.

Applicant has appreciated, however, that information on a history of a software project may be derived from the various information stored in records of a label-based system and then stored in records of a time-based system to take fuller advantage of the benefits of the time-based system. As discussed above, when a release is created in a label-based system, a listing is created of the software component versions included in the release. Additionally, when software components versions are created in the label-based system, the creation times for the software component versions is stored. Applicant has appreciated that a creation time for a release may be estimated by examining creation times for each of the software component versions included in the release, and the estimated creation time for the release may be stored in the records of the time-based system and used to create a history of the version of the software project related to the release.

The creation time for the release may be estimated from the version information for the release in any suitable manner, examples of which will be discussed in greater detail below. Some techniques, operating according to some of the principles described herein, may retrieve the listing of the contents of the release from the records of the label-based system, identifying software component versions included in the release. The creation times of each of the software component versions included in the release may also be retrieved, and the creation times for each of the "next" versions of each of the software components included in the release (e.g., if version 1 of software component X is included in the release, then also retrieve the creation times of version 2 of software component X, if a version 2 exists). The exemplary technique may then compare, for each software component for which there exists a next version, the creation times for each of the software component versions included in the release to the creation times of the next versions to identify a latest time that is before any of the creation times of the next versions. This determination may be made in any suitable manner, such as by comparing the creation times for the software component versions included in the release to the creation times of the next versions to identify a latest creation time of a software component version included in the release that is earlier than any creation time of a next version. The latest creation time may then be identified as the estimated creation time for the release.

In some time-based systems, the estimated creation time for the release may then be used to identify, in the records of the time-based system, the contents of the release. While label-based systems rely on the creation of listings, as described above, to identify the contents of a release, time-based systems may instead store an indication that a release is, for example, the contents of a version at a particular point in time. Accordingly, when a creation time is estimated for a release, the estimated creation time may be used in records of the time-based system to identify the contents of a release by associating the estimated creation time with a version of a software project and identifying the release as the state of the version of the software project at the estimated creation time.

In some implementations, techniques may also be adapted to determine exceptions and exclusions to this general rule for contents of a release and identify software components and/or software component versions which are to be included (i.e., excepted) or excluded by rules other than the general time stamp. As used herein, an "exception" is an indication that a software component version should be explicitly included in the release in the records of the time-based system, and an "exclusion" is an indication that a software component versions should be explicitly included in the release in the records of the time-based system. Exceptions and exclusions may be used as an addition to a rule specifying a time (as described above), such that the contents of a release may be more accurately described.

Exceptions and exclusions may best be understood in terms of examples. In the following trivial example shown in Table III, there are no exceptions/exclusions.

TABLE III

| Software Component | Version | Time | Label |
| --- | --- | --- | --- |
| foo.c | 1 | :01 | RELEASE1 |
| foo.c | 2 | :02 | RELEASE2 |
| bar.c | 1 | :01 | RELEASE1 |
| bar.c | 2 | :02 | RELEASE2 |
| other.c | 1 | :01 | RELEASE1 |
| other.c | 2 | :02 | RELEASE2 |

In Table III, showing records of the label-based system for software components including a creation time and labeling, each of the versions included in Release 1 was created at time 1 second (:01) and each of the versions included in Release 2 were created at time 2 seconds (:02). Thus, it may be determined, using any suitable technique including the exemplary techniques described below, that Release 1 was created at time 1 second and all versions that existed at time 1 second are to be included in Release 1 in the time-based system. No exceptions/exclusions would be created by this rule. In other words, if a line were drawn at time 1 second and everything created previous to the line were included in Release 1, no software components or versions that should not be included would be included. Table IV shows an example of one situation that would produce exclusions.

TABLE IV

| Software Component | Version | Time | Label |
| --- | --- | --- | --- |
| foo.c | 1 | :01 | RELEASE1 |
| foo.c | 2 | :02 | RELEASE2 |
| bar.c | 1 | :01 | RELEASE1 |
| bar.c | 2 | :02 | RELEASE2 |
| other.c | 1 | :01 | RELEASE2 |

As shown in Table IV, version 1 of software component other.c was created at time 1 second, but was included in Release 2 and not Release 1. This could be because, for example, the code was originally intended to be included in Release 1 but the features implemented by the code were deferred to Release 2 (e.g., the code of other.c was buggy, and was not fixed before Release 1 was made, so it was deferred). In this case, time 1 second may be determined to be the creation time for Release 1, but an exclusion may be noted for version 1 of other.c. The exclusion may be stored in the records of the time-based system as part of the information identifying the release, to support the description "Release 1 includes all versions created at or before time 1 second other than version 1 of other.c." Exceptions may be similarly determined and noted, identifying software component versions which should be explicitly included (such as a software component version created after one of the "next versions" had been created). Exceptions and exclusions may be stored in any suitable manner, including by any of the exemplary techniques outlined below.

FIG. 1 shows a flowchart of one example of a process for determining the contents of a release operating according to some of the principles described herein. It should be appreciated that the process 100 shown in FIG. 1 is merely illustrative of processes that may be implemented according to one or more of the principles described herein, and that any suitable technique may be implemented.

The illustrative process 100 of FIG. 1 begins in block 102, wherein data is migrated from a label-based system to a time-based system. The data that is migrated may comprise software components (e.g., files and directories) and any suitable information (e.g., metadata) on the software projects managed by the label-based system. Once this data has been migrated and stored in the data stores of the time-based system, then, in block 104, the data may be sorted into versions. In time-based systems which store information in streams, this may comprise sorting the data into streams, and may comprise establishing histories for the versions from the data migrated in block 102.

Blocks 102 and 104 of process 100 may be implemented in any suitable manner. In accordance with one exemplary technique, once all the software components stored by the label-based system have been retrieved and stored in the data stores of the time-based system, Application Programming Interface (API) calls may be made to the label-based system to retrieve information (e.g., metadata) on files, versions, and branches stored by the label-based system. The retrieved information on the files, versions, and branches may then be used to associate the software components with versions of a software project in the time-based system, and thereby populate the versions of the software project with versions of software components and, in some cases, a history of changes to the version of the software project.

Once the versions have been established in block 104, then in block 106 the process 100 begins determining contents of a release and storing information related to the release in records of the time-based system. In block 106, the process 100 examines metadata stored in the label-based system regarding a release. This metadata may be any information related to the release, including the listing, described above, of software component versions included in the release and creation times for each of the software component versions. Some techniques may also examine the creation times of each of the "next" versions of the software components included in the listing, as outlined above and as described in greater detail below.

This metadata may be retrieved from the label-based system in any suitable manner. For example, API calls implemented by the label-based system may be used to retrieve the information. In cases where the label-based system is Rational ClearCase3 available from the IBM Corporation, API calls such as cleartool find -avobs -version "lbtype(REL1.1)" -print could be used to retrieve from the records of the label-based system a listing of all software components in a listing which have the label "REL1.1." Similar API calls may be implemented for other label-based systems, or any other suitable technique may be used to retrieve the information. Once a listing of software component versions has been retrieved, then the creation times for these software component versions may be retrieved from the records of the label-based system, either from a data store of metadata about the software components or from a data store of the software components themselves (e.g., properties of a file on disk). Creation times may also be retrieved for the "next" versions in a similar manner.

In block 108, the process 100 estimates a creation time for the release using the metadata. This may be done in any suitable manner, including as outlined above and as described in greater detail below. The estimated creation time is then, in block 110, stored in a data structure in the records of the time-based system, and may, in some time-based systems, be used to generate a time-based version or snapshot. In block 112, the process 100 determines whether any exceptions or exclusions exist and, if so, stores indications of the exceptions and/or exclusions in the records of the time-based system, and the process ends. This process, particularly blocks 106-112 of the process, may then be repeated for any number of releases maintained by the label-based system.

Further details of the methods and apparatuses which may be implemented according to the principles described herein are offered below. First, however, to facilitate this further discussion, an overview of exemplary configurations for software projects is now provided. In the exemplary configurations, versions of a software project are maintained by a time-based system as streams. It should be appreciated, however, that streams are merely exemplary of the type of data structures that may be implemented in accordance with the techniques described herein and that other implementations are possible.

Figure 2:
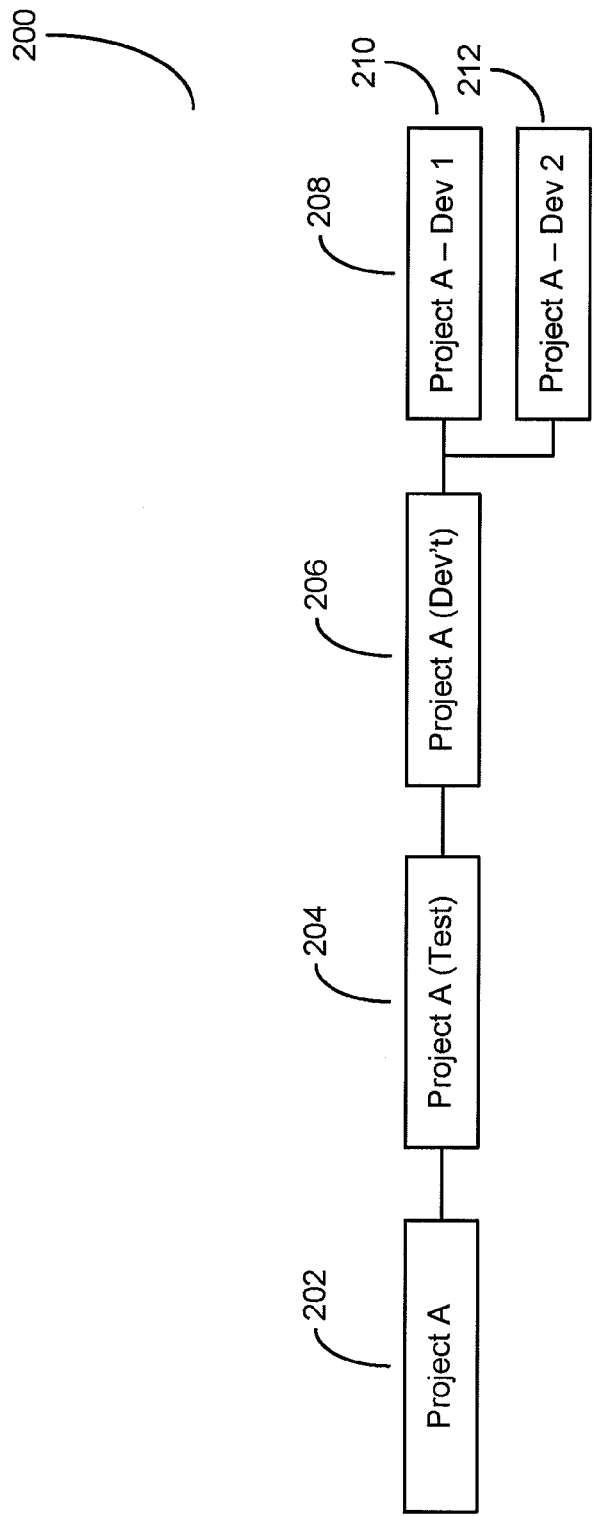
FIG. 2 shows an exemplary version hierarchy which may be managed by CM applications in accordance with some of the principles described herein.

CM applications in time-based systems may maintain versions of software projects in a version hierarchy. Thus, when versions are implemented as streams, a stream may be part of a stream hierarchy. A "stream hierarchy" (and, by abstraction, a version hierarchy) is a logical hierarchy of streams defining relationships between streams. As shown in FIG. 2 (discussed in greater detail below), a stream hierarchy may include at least one stream, the "source stream," which is at the highest level of the hierarchy (202) and is the stream from which the other streams of the hierarchy are ultimately derived. Thus, the source stream is said to be the "parent" of all other streams, and the other streams directly derived from it are (at least initially) its "children." In general, a stream having one or more children is a "parent stream" or "parent" of each of its child streams. A parent stream, including the source stream, may have one or more "children" or "child streams," each of which inherits one or more properties of the parent stream and its ancestors. For example, each child stream includes at least a subset of the directory elements (discussed below) included in its parent stream. A child stream may be derived directly (i.e., created from) its parent stream, though this is not always the case, as a stream's relative position within the hierarchy may change over time. As a result, a child stream may, at some time, have a parent from which the child was not originally derived.

Some CM applications operating according to the principles described herein may implement one or more types of streams. For example, one type of stream is the one discussed above, which may describe a version of a software project and a set of software components associated with the version. Other types of streams may have additional functionality. For example, a "project stream" may be a stream in which the stream data structure (i.e., the base structure of the stream as discussed above) has an additional element which describes that the project stream is a source stream for a software project.

As another example, a workspace may be implemented as a stream having an additional element in the data structure indicating that changes may be made to the software components associated with the workspace. Accordingly, as used herein, a "workspace" is a type of stream in which a developer can make changes to the content of a software project (e.g., the software components of the software project). Workspaces, in some exemplary implementations, may be limited to being at the bottom of a stream hierarchy and any stream ancestry chains determined for the stream hierarchy. In some embodiments, workspaces are further configured such that they cannot have child streams; i.e., so that they cannot be a parent stream. Thus, in some embodiments, changes to a software project are made only in workspaces and then propagated to other streams according to techniques discussed in greater detail below.

As discussed briefly above, FIG. 2 shows an exemplary stream hierarchy for Project A 100 comprised of a plurality of streams. Stream 202 (marked Project A) may be considered the source stream for the stream hierarchies 100. Some of the child streams of stream 202, such as child streams 210 and 212, are represented as workspaces for developers (e.g., Workspace—Developer 1 (Dev 1) 210, Workspace—Developer 2 (Dev 2) 212, etc.). A developer may have a single workspace where all changes are made, or the developer may have multiple workspaces depending on which software project he or she is working. The stream hierarchy, in addition to the workspaces, has development stream 206, to which developers may propagate work done in their workspaces (e.g., changes made to one or more software components). Changes may be propagated up a hierarchy or propagated down in a hierarchy. As used herein, "promote" means to propagate up a hierarchy, whereas "update" means to propagate down through a hierarchy.

The stream hierarchy also has testing stream 204, which may hold streams for the projects that are used by test engineers such as Quality Assurance (QA) engineers to test the work done by the developers. In the stream hierarchy, software components may be propagated up the stream (i.e., "promoted") or may be propagated down the stream (i.e., "updated"). For example, a software component edited by Developer 1 may be promoted from workspace 206 of Developer 1 to the development stream 204 for Project A, and the versions of the software component of the other child streams of the development stream 204 (i.e., workspaces of Developers 2, 3, 4) may be updated.

In some exemplary implementations, properties of a version (e.g., the software component versions included in the version and/or a status of the version) may be determined in one or more ways. For example, in some implementations, the properties of a version may be determined based on inheritance rules and the parent versions of the version. In these implementations, when a change is made to a parent version, the child version will be updated with the change. As described in greater detail below, in some implementations, in some child versions—such as time-based versions and snapshots—these changes may be inherited up to a particular point in time and not thereafter. Some implementations may additionally or alternatively determine the properties of a version using include and exclude rules.

As used herein, an "include/exclude rule" or "I/E rule" is a rule specifying whether to include or exclude software components from a version. In some embodiments, if the software component is a directory, an I/E rule may specify whether to include or exclude one or more of the child elements of the directory from the version. Any of a variety of types of I/E rules may be used, including, but not limited to: an include rule, an include directory only (IDO) rule, and an exclude rule. An "exclude rule" is an I/E rule that, when defined for a directory of a version, specifies that the directory element and its child elements, if any (i.e., if it is a directory), are excluded from the version. An "include rule" is an I/E rule that, when defined for a software component of a stream, specifies that the software component is included in the version. An include rule may also specify that each of the software component's child elements, if any (i.e., if it is a directory), are included in the version, unless an exclude rule has been defined for the child element. In other words, each child element of an software component for which an include rule has been specified are included in the version by default, unless an exclude has been specified for the child element. An "include directory only rule" or "IDO rule" is an I/E rule that can only be defined for software components which are directories, and not for files or other types of software components. When defined for a directory, an IDO rule specifies that the directory is included in a version; however, each of the directory's child elements, if any, are excluded from the version, unless an include rule has been defined for the child element. In other words, each child element of a directory for which an IDO rule has been specified are excluded from the version by default, unless an include rule or IDO rule (for directories only) has been specified for the child element.

I/E rules may be used to set the properties of a version by specifying, for example, the contents of a version. An include rule may be used, for example, to specify that a software component which is not a included in a parent version should be included in a version, while an exclude rule may, likewise, specify that a software component included in a parent version should not be included in a version.

It should be appreciated that the structures of software projects of FIG. 2 (e.g., the stream hierarchies) are merely exemplary, and that techniques operating according to some or all of the principles described herein are not limited to implementing the illustrative hierarchies and structures shown in FIG. 2. Methods and apparatuses operating according to the techniques described herein may implement any suitable structure for software projects and versions of software projects.

Figure 3:
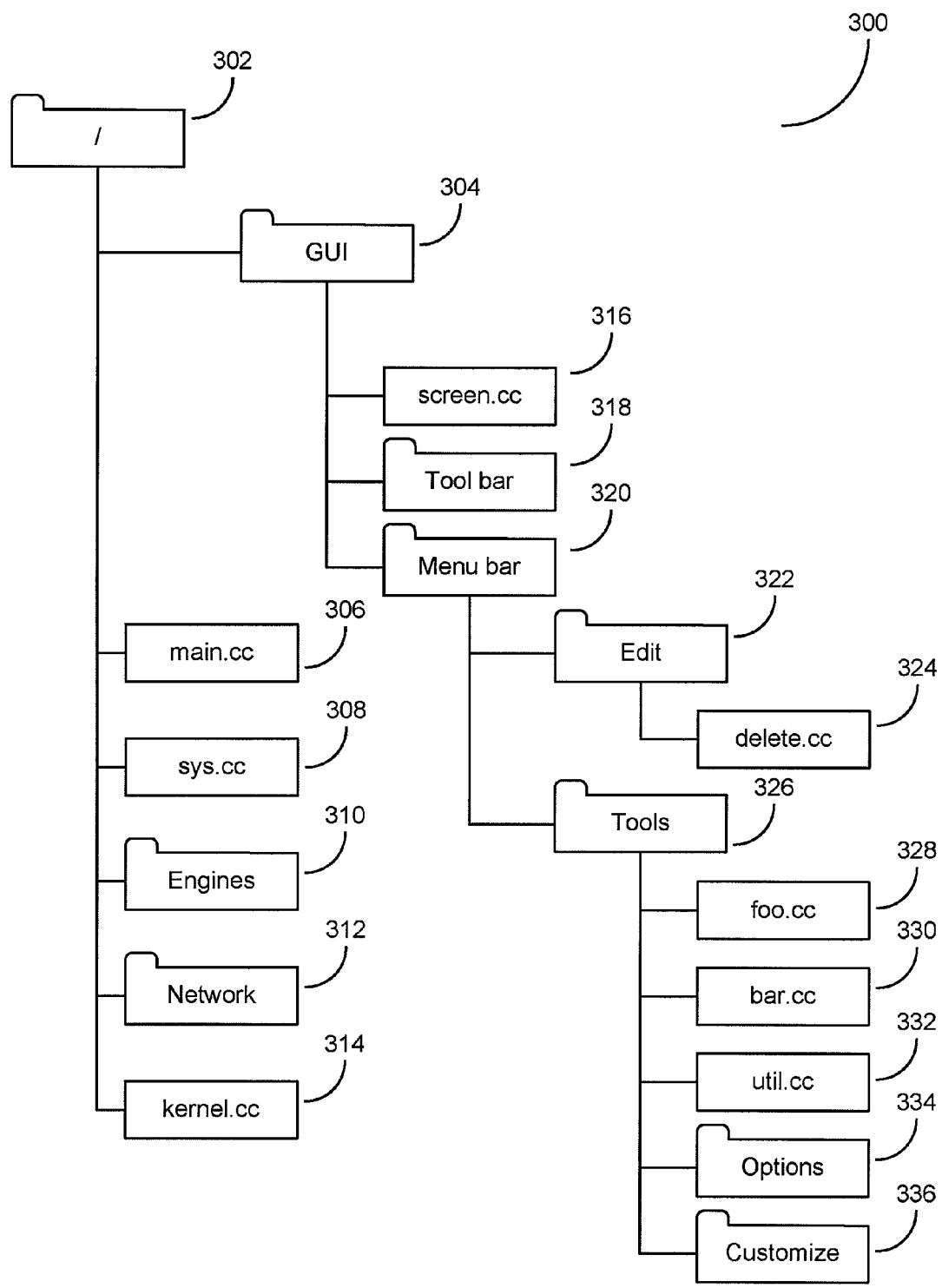
FIG. 3 is a diagram illustrating an exemplary of an software component hierarchy.

A version of a software project (e.g., a stream), as mentioned above, is a set of software components that may be related to the software project. As used herein, "software components" include any element of a software project. Software components may be, for example, a program, a file, a directory, a directory element, an object, a record, a table, another type of software component, and any combination thereof. As used herein, a "directly element" is a directory or a file. Additionally, elements of software projects, such as a files, may be organized in a hierarchy. A "file hierarchy" is a logical hierarchy defining an organization of files. FIG. 3 illustrates an example of a file hierarchy. A file hierarchy includes at least a root directory 302 at a highest level of the hierarchy. The root directory may include, at a second level in the hierarchy, one or more directory elements. As used herein, a "directory element" is an element of a directory, and may be any of a variety of types of software components. For example, a file such as file 306 ("main.c") or a sub-directory such as sub-directory 304 ("GUI") may be directory elements. As used herein a "directory," including the root directory and any of its sub-directories, is a directory element (e.g., of a file hierarchy) that includes one or more other directory elements (e.g., files and/or directories).

As used herein, a "child element" or "child" of a directory is an element included within the directory at a level immediately below the level of the directory in the hierarchy, whereas any element included within the directory, regardless of level, is referred to as a "descendant element" or a "descendant" of the directory. For example, directory 34 is a child element of root directory 302, while directory 320 is a descendant element of root directory 302. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computation and storage capabilities of the system on which the file hierarchy is implemented.

In some exemplary implementations, each software component of a software project is assigned a unique identifier for the software component. The identifier preferably is "unique" in that it is assigned to the component on the component's creation and it stays with the component regardless of which version or versions the software component is a part or changes to the component made by a developer. The unique identifier, which in some implementations may be termed an element identifier (EID), may be any of a variety of types of identifiers, such as numerical, alphabetical, alpha-numerical, etc. If the component represented by an EID is a file or directory, providing a numerical value may avoid problems commonly encountered in known systems where an alphabetic identifier is used. For example, files and directories are frequently renamed, such that a current name of a file or directory may not be a same name that the file or directory had in the past. Further, the current name may be a name formerly used by another file or directory. The ability of a file or directory name to change over time, and the absence of another unique identifier that remains constant, may create confusion and cause problems when an attempt is made to determine a status of a file or directory at a past time. For example, in some conventional CM applications (e.g., some label-based systems), if an attempt is made to determine the status of a file in the past (e.g., by resorting to tape backup), and the file had a different name and another file had the file's current name, the wrong file may be identified and an incorrect status determined. This problem may be eliminated in time-systems operating according to the principles described herein by providing a unique numerical identifier for a file or a directory that remains constant throughout the life of a file or directory, regardless of whether the file's or directory's name is changed.

In addition to an EID, in some implementations, a software component may be associated with one or more other values indicating one or more versions of the software component. For example, a software component may be associated with one or more stream IDs, one or more instance IDs, one or more real stream IDs, one or more edition IDs, a transaction ID, and/or any other suitable identifier. These other identifiers may be used to identify "virtual versions" and "real versions" of the software component which are included in versions of the software project, though alternative implementations may not track real and virtual versions of software components and thus may not store these identifiers, or may store more or fewer identifiers to track version information in any other suitable manner.

A "virtual version" may be an instance of the software component. The virtual version may have the same content as, or different content than, other virtual versions of the software component, including the software component from which it was created. Thus, although it is common in the field of software configuration management to refer to different instances of a software component (e.g., components in different versions of a software project) as different "versions" of the component (even if the content of each "version" is in fact the same), such instances are referred to herein at "virtual versions."

Alternatively, a "real version" is an edition of a software component having different content than the previous real version of a software component from which the edition was created. Thus, if a change is made to a software component and recorded (as part of a project), a new real version of the software component may be created.

For example, referring to the version hierarchy shown in FIG. 2 and element hierarchy shown in FIG. 3, if file 306 were created in workspace 210 and promoted to version 306, the virtual version (i.e., instance) of file 306 in each stream would be different, although the real version (i.e., edition) of the file would be the same. If file 306 were then edited in workspace 212, workspace 212 would have a different real version of file 306 than workspace 210.

As used herein, a "version" of a software component (e.g., a file) or a "software component version" means the real version of the software component, not the virtual version of the software component. Thus, in determining a software component version included in an issue resolution or a stream, the real version of the software component is determined. As discussed above, in some implementations, modifications to a software component (e.g., add, remove, change) are made in workspaces only. In such embodiments, each version (i.e., real version) of a software component may correspond to the workspace in which it was created.

A stream ID stored in association with a software component may, therefore, be used to represent the stream ID of the stream of a virtual version of the software component. An instance ID of the software component may be used to identify a an instance of the virtual version of the software component. A stream ID and an instance ID may, then, be used to specify a stream/instance pair defining a virtual version of a software component. Likewise, a real stream ID and an edition ID of a software component may define a real version of a software component.

Table V shows an exemplary record for real and virtual versions of a software project. It should be appreciated that this record is merely illustrative, and that other implementations may store version information for software components in any suitable manner. For a given software component (e.g., file 306 of FIG. 3) with an EID of 2, a record for the software component stored by a CM application may be:

TABLE V

| EID | Stream ID | Instance ID | Real Stream ID | Edition ID | Transaction # |
| --- | --- | --- | --- | --- | --- |
| 2 | 4 | 1 | 4 | 1 | 6 |
| 2 | 3 | 1 | 4 | 1 | 7 |
| 2 | 2 | 1 | 4 | 1 | 8 |
| 2 | 5 | 1 | 5 | 1 | 9 |
| 2 | 4 | 2 | 4 | 2 | 10 |
| 2 | 4 | 3 | 4 | 3 | 11 |
| 2 | 5 | 2 | 4 | 3 | 12 |
| 2 | 5 | 3 | 5 | 3 | 13 |

For the purposes of the exemplary record shown in Table V, and for further examples discussed below, Table VI shows stream IDs for the streams shown in the exemplary version hierarchy of FIG. 1.

TABLE VI

| Stream ID | FIG. 1 Identifer | FIG. 1 Name |
| --- | --- | --- |
| 1 | 102 | Project A |
| 2 | 104 | Project A (Test) |
| 3 | 106 | Project A (Dev't) |

TABLE VI-continued

| Stream ID | FIG. 1 Identifer | FIG. 1 Name |
|---|---|---|
| 4 | 110 | Workspace - Dev. 1 |
| 5 | 112 | Workspace - Dev. 2 |

Each entry of Table V may specify a virtual version of a software component, the corresponding real version of the software component, and the transaction number of the transaction that created the virtual version of the software component. As shown in Table V, a software component with an EID of 2 (e.g., file 306 of FIG. 3), has five "real versions" created by developers: a first edition of file 306 created in stream 4, a second edition created in stream 4, a third edition created in stream 4, a first edition created in stream 5, and a third edition created in stream 5. As discussed above, a real version is defined by a real stream ID/edition ID pair. Table V also shows that file 306 is included in four different streams of the software project, streams 2, 3, 4, and 5, because each of those four streams includes a virtual version of the file, or a reference to a real version of the file. The virtual version of stream 1, for example, is a reference to the real version 4/1, the first edition of the file created in stream 4. Likewise, the virtual version 3/1 (the first instance of stream 3) is a reference to real version 4/1. As may be also seen from Table V, stream 5 initially created a new version of file 306 in real version 5/1, later included a virtual version 5/2 referencing the real version 4/3 of the file, and then later made its own edits to the file and created real version 5/3.

Table V, in addition to including fields regarding real and virtual versions of a software component, also includes a field for a transaction ID number for a transaction that created the real or virtual version. In some exemplary implementations, a CM application may associate each action taken by a user and/or automated action taken by the CM application itself with a transaction number, such that actions may be tracked and a user may be able to determine a sequential ordering of steps taken by the user, other users of the CM application, and/or the CM application. A transaction ID may be a sequential number, a time at which the action was taken, or any other suitable identifier. Associating actions with transaction IDs may be advantageous in a number of ways, such as aiding users in determining when errors were inserted into a software project, for example, and aiding users in "rolling back" changes that created errors. It should be appreciate that methods and apparatuses operating according to embodiments of the invention are not limited to implementing CM applications tracking actions taken by users or the CM applications, and that CM applications implemented in accordance with the principles described herein may store any suitable information.

The transaction history shown in Table V may also be useful in creating two other types of versions: time-based versions and snapshots. These two types of versions (which may also be implemented as streams, in some implementations) may be created as children of a basis stream having a history. Where typical child versions, as described above, will inherit the current state of the parent version—and thus inherit any new software component versions that are promoted to the parent version—time-based streams and snapshots are versions which only inherit the contents and properties of a parent stream until a particular point in time. A time-based version or snapshot comprises a reference to a basis version as well as a reference to a particular point in time and/or transaction number at which to stop inheriting the state of the basis version. In a time-based version, additional edits may be made to the version (e.g., additional material added through include/exclude rules), and children versions may be added which may promote changes to the time-based version, but no changes made to the basis version (i.e., the parent version of the time-based stream) after the reference time/transaction will be inherited by the time-based stream. A snapshot, on the other hand, may be considered to be an immutable version. Once created, a snapshot may never be changed.

TABLE VII

| EID | Parent Stream | Parent Edition | Child Stream | Child Edition |
|---|---|---|---|---|
| 2 | 4 | 1 | 5 | 1 |
| 2 | 4 | 1 | 4 | 2 |
| 2 | 4 | 2 | 4 | 3 |
| 2 | 4 | 3 | 5 | 3 |

Table VII shows another exemplary data structure which may be implemented to track version ancestry for a file. Table VII shows a record of parent/child relationships between real versions of a software component. As used herein, a "parent" version of a particular version of a software component is the version from which the particular version was created. Conversely, a "child" version of a particular version of a software component is a version created from the particular version. A new entry may be added to a record such as the one shown in Table VII each time a transaction results in the creation of a new real version of a software component.

For each entry in Table VII, an EID field may hold a value representing a unique identifier (e.g., a number) of a software component. The combination of values of the Parent Stream and Parent Edition fields may specify a unique stream/edition pair defining a real version of the software component specified by the EID field. This real version is the parent of the real version specified by the unique stream/edition pair specified by the Child Stream and Child Edition fields.

In some implementations, a data store of software components may store different real versions of a software component as a series of "deltas" or differences from a previous version. For example, the first version of a file maybe stored in full, while a second version of the file may be stored only as one or more references to deletions and/or additions that were made to the file between versions. When a version of a file is needed (for example, at build time for a software project or when a developer wants to view and/or edit the file), then the original file may be retrieved and any necessary additions and/or deletions made by versions between the original version and the version on which work is being done applied. In this manner, CM application implemented in accordance with these implementations may conserve disk space by not storing full copies of files.

CM applications may additionally or alternatively store records for determining software components included in streams at particular times. Table VIII shows exemplary data and fields that may be included in such records.

TABLE VIII

| Stream ID | EID | Transaction # | In-progress? |
|---|---|---|---|
| 4 | 2 | 6 | 1 |
| 4 | 2 | 7 | 0 |
| 2 | 2 | 7 | 1 |
| 2 | 2 | 8 | 0 |
| 1 | 2 | 8 | 1 |
| 5 | 2 | 9 | 1 |
| 4 | 2 | 10 | 1 |

TABLE VIII-continued

| Stream ID | EID | Transaction # | In-progress? |
|---|---|---|---|
| 4 | 2 | 11 | 1 |
| 5 | 2 | 12 | 1 |
| 5 | 2 | 13 | 1 |

In Table VIII, the stream ID field may hold a value specifying an ID of the stream to which the entry in the record applies. EID field may hold the EID of the software component represented by the entry. The transaction number field, as mentioned above, may hold a value representing a transaction number or other value corresponding to a time at which the entry was made. The in-progress field may hold a value indicating whether the software component is in progress for the stream at the time corresponding to the value of the transaction field. As described above, a software component of a stream is "in progress" if a modification has been made to the software component (i.e., it has been added, modified, or removed) and the stream has not been promoted to a parent stream (i.e., propagated up in a version hierarchy). If a software component is in progress within a stream, then the version of the software component in the stream and its children may be different than the version of the software component elsewhere within the stream hierarchy. For example, the software component may not even exist in other streams in the hierarchy. Alternatively the software component may have been removed from the subject stream and its children, but still may be present in other stream of the stream hierarchy.

Having now described the arrangement of exemplary records which may be maintained by some exemplary implementations regarding software components and streams, examples of transactions that may result in the entries in Tables V, VII, and VIII will now be described. References may be made to the version hierarchy of FIG. 2, the element hierarchy of FIG. 3, and the stream IDs shown in Table VI.

In transaction six, file 306 may have been created in workspace 210, resulting in the creation of a new virtual version and a new real version of file 306. This transaction may have resulted in the first entries of Tables V and VIII (i.e., those having a Transaction ID of 6). As indicated in Table VIII, because file 306 is yet to be promoted from workspace 110 to stream 206, the in-progress field for the entry indicates that file 306 is in progress in workspace 210. The entry in Table V for this transaction indicates that the virtual version (4/1) and the real version (4/1) resulting from transaction six are the same.

Transaction six does not result in the creation of an entry in Table VII because file 306 is a new file for which version ancestry has not yet been established.

In transaction 7, file 306 may be promoted from stream 110 to stream 206. resulting in the creation of a new virtual version of file 306. Transaction seven may result in the second and third entries of Table VIII and the second entry of Table V. As indicated by the entries in Table VIII, file 306 is no longer "in progress" in workspace 210, but is in-progress in stream 206. The entry in Table V indicates that the virtual version (i.e., stream/instance pair) 3/1 corresponds to the real version (i.e., stream/edition pair) 4/1. Transaction seven does not result in the creation of an entry in Table VII because transaction seven did not result in the creation of a new real version of the file 306, but merely the creation of a new virtual version.

In transaction eight, file 306 may be promoted from stream 206 to stream 204, resulting the creation of a new virtual version of file 306. Transaction eight may result in the fourth and fifth entries of Table VIII and the third entry in Table V. Transaction eight does not result in the creation of an entry in Table VII because a new real version of file 306 has not been created.

In transaction nine, file 306 may be modified in workspace 212 (in which file 306 was included because workspace 212 is a descendant stream of streams 204 and 206) and the modification recorded to create a new virtual version and new real version of file 306. Transaction nine may result in the sixth entry of Table VIII, the fourth entry in Table V, and the first entry in Table VII. The entry in Table VII reflects that real version 5/1 was created from real version 4/1.

In transaction ten, file 306 may be modified in workspace 110 and the modification recorded to create a new virtual version and a new real version of file 306. Transaction ten may result in entry seven in Table IV, entry five in Table V, and entry two in Table VII. The entry in Table VII indicates that new real version 4/2 was created from real version 4/1.

In transaction eleven, file 306 may be modified in workspace 210 and the modification recorded to create a new virtual version and a new real version of file 206. Transaction eleven may result in the eighth entry in Table VIII, the sixth entry in Table V, and the third entry in Table VII.

In transaction twelve, file 306 may be sent from workspace 210 to workspace 212, thereby creating a new virtual version of file 306. In other words, rather than promoting a file from workspace 210 to stream 206 and stream 204, a user (e.g., a developer, project leader, etc.) may directly send (e.g., copy and paste) file 306 from workspace 210 to workspace 212, thereby replacing whatever version of file 306 currently resides in workspace 212. For example, a user interface (e.g., a GUI) may enable a user to specify file 306 (e.g., by typing in an identifier or selecting it from a user interface display), and send file 306 to workspace 112.

Transaction twelve may result in entry nine in Table VIII and entry seven in Table V. The entry in Table V indicates that virtual version 5/2 of the file 306 created in workspace 212 corresponds to real version 4/3 of the software component in workspace 110. It should be appreciated that transaction twelve did not result in an entry in Table VII because it did not result in the creation of a new real version.

In transaction thirteen, file 306 may be modified in workspace 212 and the modification recorded to create a new virtual version and a new real version of file 306. Transaction thirteen may result in the last entry in Tables V, VII, and VIII. The entry in Table VII, as before, indicates that the new real version 5/3 of file 306 was created from real version 4/3 of file 306.

It should be appreciated that these exemplary transactions are merely illustrative of actions that may be supported by CM applications implemented in accordance with the principles described herein and that in some exemplary implementations CM applications may not support some of these actions or may support actions not described above. Further, it should be appreciated that the data structures and records described above in conjunction with Tables V-VIII are merely exemplary and that some implementations of methods and apparatuses operating according to the principles described herein may maintain any suitable records implemented in any suitable data structures.

As described above in conjunction with FIG. 1, when migrating information from a label-based system to a time-based system, the data stored in records of the label-based system (e.g., data of individual software components such as code files and/or metadata about software projects) may be converted into versions in the format of the time-based system. Thus, the data of the label-based system may, in some exemplary implementations, be associated with streams as outlined above. Associating the data with versions may be done in any suitable manner, as the principles described herein are not limited to performing in any specific way an import of the data of a label-based system. One exemplary technique will now be described, though it should be appreciated that other techniques are possible.

Figure 4A:
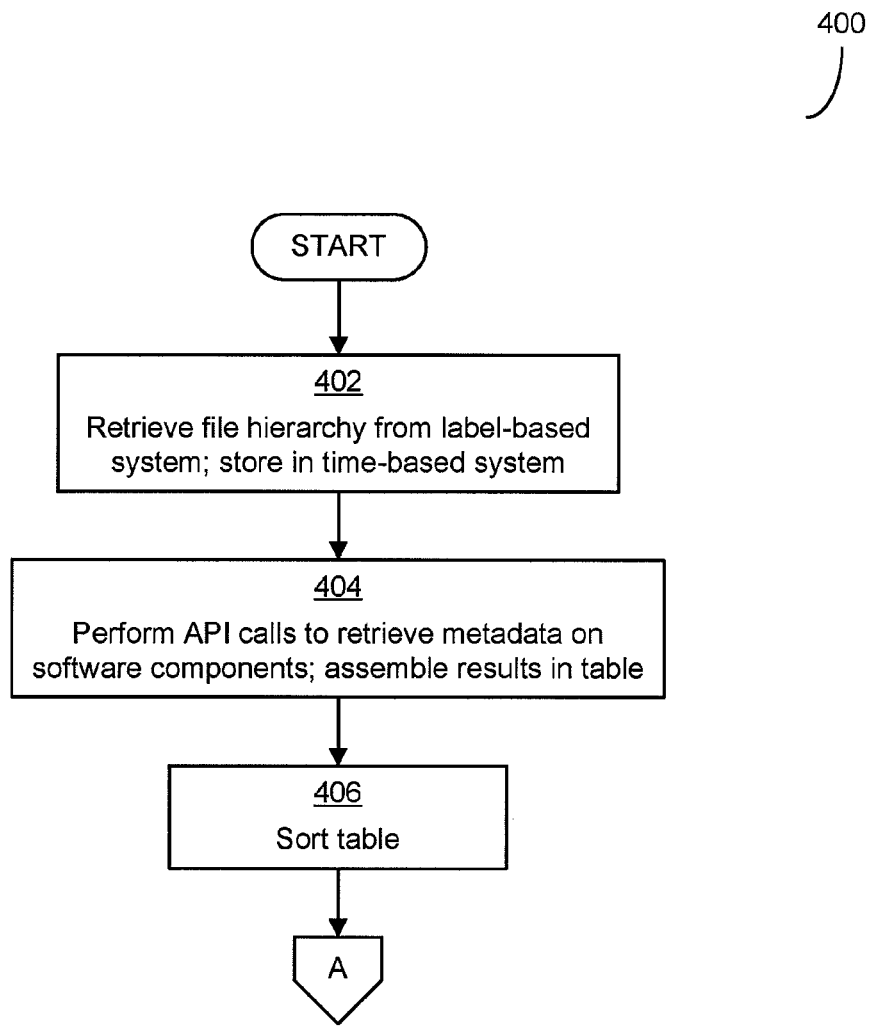
FIGS. 4A and 4B (referred to collectively below as FIG. 4) together show a flowchart of an exemplary process for importing data from a label-based system to a time-based system that may be implemented in accordance with some of the principles described herein.
Figure 4B:
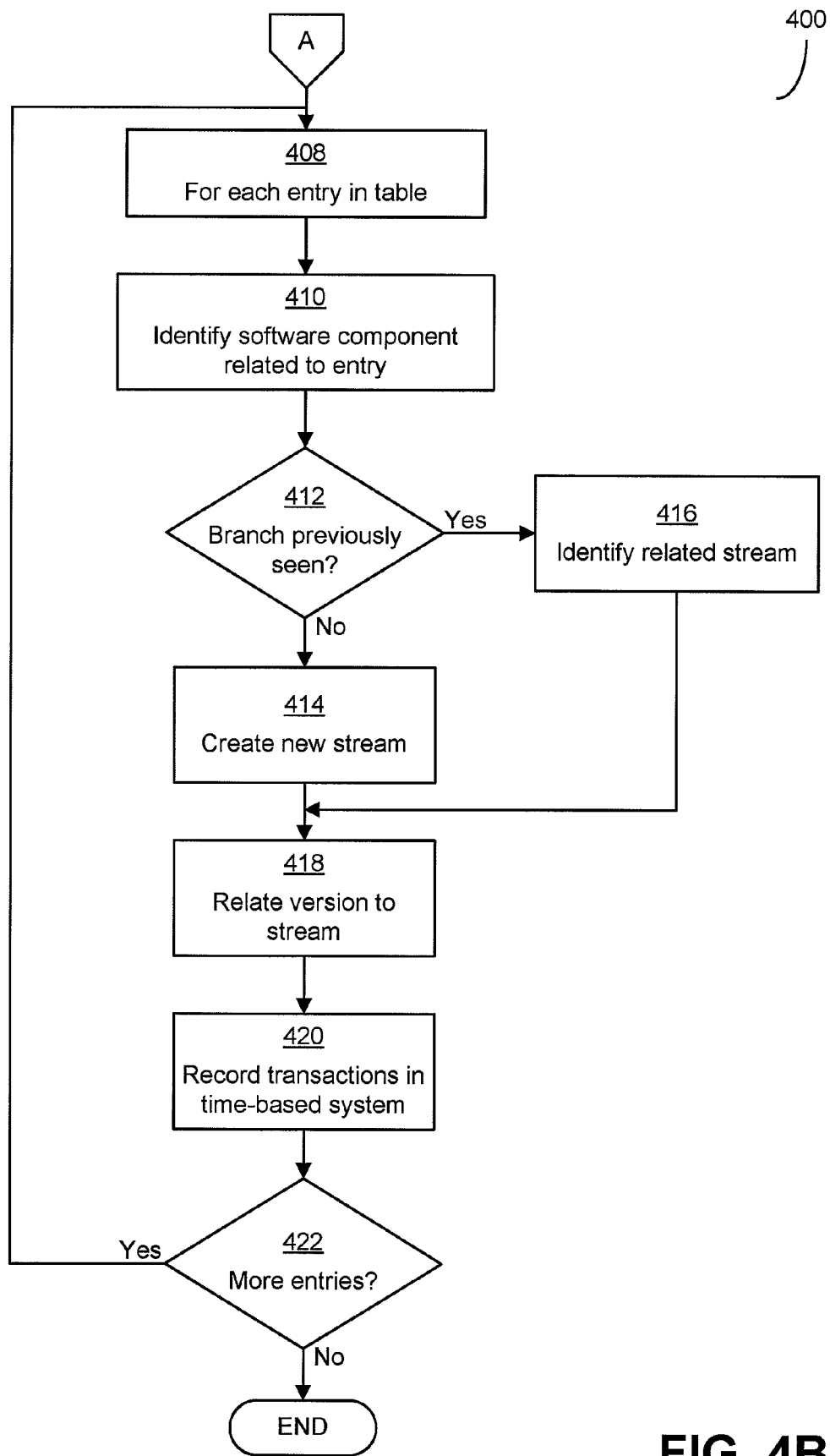

FIG. 4 (comprising FIGS. 4A and 4B) shows an illustrative process 400 that may be implemented by an import module of a time-based system for importing data from a label-based system and associating software components with versions of a software project. It should be appreciated that while process 400 will be described in terms of retrieving information from the records of the label-based system, in some implementations the information may be sent by the label-based system and received by the import module.

Process 400 begins in block 402, wherein the import module retrieves from a storage area (e.g., a designated portion of one or more computer storage media) of the label-based system one or more file structures storing software components (e.g., files and directories) managed by the label-based system. Each software component in the file structure may be a version of a software component, in the case where multiple versions of a software component exist. The file structure of the label-based system retrieved in block 402 may then be stored in a storage area of the time-based system.

In block 404, the import module performs one or more API calls to the label-based system to determine metadata associated with each of the software components of the label-based system, and assembles the information received in response to these API calls into a table of information on software components. This table may comprise information on each of the versions of the software components in each of the branches in which a software component is included in the label-based system. This information may comprise, for example, the name of the software component, the branches the software component in which is included, the versions of the software component (i.e., the software component versions), and the creation times of each of the software component versions.

In block 406, the table of information is sorted by the import module to place the results in chronological order, for association with the time-based system. The table may be sorted one or more times, such as a sort by creation time followed by a sort by name, a sort by branch name, and a sort by version number.

In block 408, the import module begins associating software components with versions by stepping through the entries in the table. For clarity, the association process will described in connection with the illustrative structures described above, though it should be appreciated that this is only exemplary and other implementations may store information in any suitable format. In block 410, a selected entry in the table is examined, and the file name indicated in the entry used to identify a software component stored in the time-based system. In block 412, the branch name in the entry to examined to determine if it is a new branch name or has been previously-encountered in the table. If the branch name is new, then in block 414 a new stream (or other suitable version data structure) is created in the table-based system. If, however, the branch name has been previously encountered in the table, then in block 416 the corresponding stream is identified. In block 414, the version number in the entry is then used to identify a particular version of the software component to be associated with the stream, and a new real version of the stream is created with an identifier linked to the stream identified by the branch name of the entry. Block 414 may further comprise identifying the newly-added version as the active version in the stream, and changing a stream history to indicate a previously-included version having the same file name as an inactive version. One or more transactions may then, in block 416, be recorded in the time-based system indicating that the real version was created at the time corresponding to the creation time in the entry. In block 418, the import module checks to see if more entries exist in the table and, if so, moves on to the next entry. Otherwise, the import process ends.

As discussed above, it should be appreciated that the technique shown in FIG. 4 is merely exemplary of the techniques which may be implemented by an import module, and that any suitable technique for importing software components may be used in accordance with the principles described herein.

The process 400, executed by the import module, results in versions (e.g., streams) being established in the time-based system and creates a history of changes that have been made to the versions, derived from the information contained within the records of the label-based system. As discussed above, however, this information does not permit the time-based system to identify particular points in the history of the versions at which releases were created. Given creation times for releases, time-based versions or snapshots may be created which reference the versions created by the import module and reference a particular time/transaction in the history of the versions. These time-based streams or snapshots may then be used to identify the contents of a release, such that users may quickly and efficiently determine a state of a release at a particular point in time without having to perform various searches or examine histories.

Determining the contents of a release and creating a time-based stream or snapshot may be done in any suitable manner, as the principles described herein are not limited to being implemented according to any specific technique or techniques. Exemplary techniques are described below, but it should be appreciated that these techniques are merely illustrative of the type that may be implemented and others are possible.

In some implementations, a creation time for a release may be estimated from the creation times of software component versions included in the release and creation times of later versions of those software components which are not included in the release. This information may be retrieved, for example, from records of the label-based system through executing suitable API calls, as described above, or in any other suitable manner.

Figure 5:
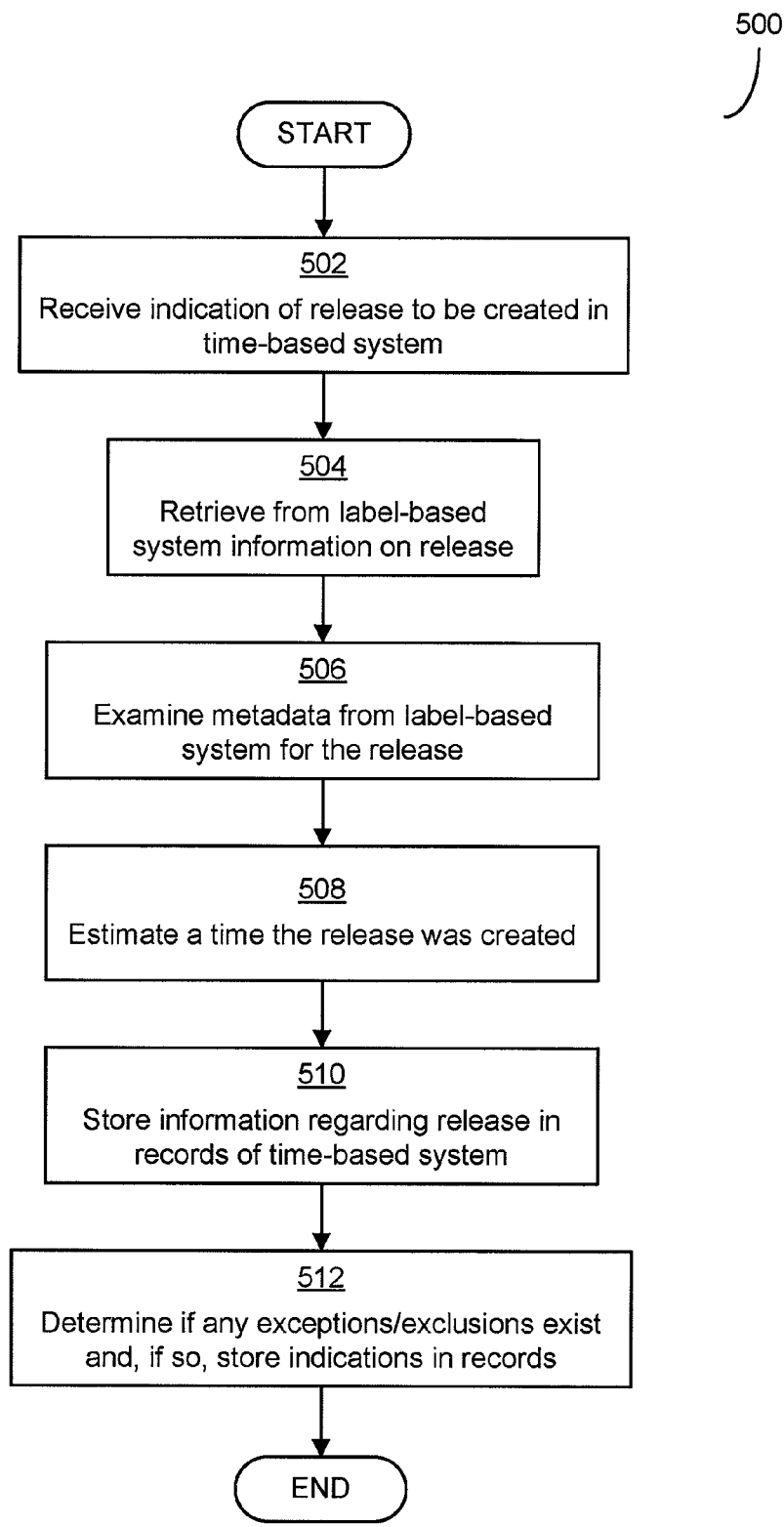
FIG. 5 is a flowchart of an exemplary process for creating a record of a release in a time-based system based on input information from records of a label-based system regarding the release that may be implemented in accordance with some, but not all, of the principles described herein.

FIG. 5 shows one illustrative technique that may be implemented according to these principles. The process 500 of FIG. 5 may be implemented by an estimation module to determine create a record of a release in the time-based system based on input regarding the release from the label-based system.

The process 500 begins in block 502, in which the estimation module receives an indication of a release to be created in the time-based system. The indication received in block 502 may be any suitable identifier for a release, such as a name for the release, and may be received from any suitable source, such as another process of the time-based system (e.g., another module assisting in migration of data from the label-based system to the time-based system), from a user of the time-based system, from any component the label-based system or a process interacting with the label-based system, or any other suitable source. The identifier received in block 502 begins the process of creating, in the time-based system, a release corresponding to the identifier.

In block 504, the estimation module retrieves information related to the release from the label-based system. This may be done in any suitable manner, such as by executing one or more API calls supported by the label-based system. As described above, in the case that the label-based system is Rational ClearCase, available from the IBM Corporation, at least one of the one or more API calls may be:

cleartool find -avobs -version "lbtype(REL1.1)" -print

The information retrieved by the one or more API calls will comprise information, stored by the label-based system, on the contents of the release identified by the indication "REL1.1" (which may be, in this example, the indication received in block 502). The information retrieved may comprise software component versions included in the release, as well as creation times for those software component versions. Table IX shows one example of a listing of information that may be retrieved by the one or more API calls.

TABLE IX

| Software Component | Version | Label | Creation Time |
|---|---|---|---|
| foo.c | 2 | REL1.1 | :02 |
| bar.c | 1 | REL1.1 | :01 |
| other.c | 3 | REL1.1 | :05 |

In block 506, the estimation module examines the software component versions included in the release, as indicated by the information retrieved in block 504, and retrieves information on the "next" versions of the software components included in the release, if any. For example, if version 1 of software component X is included in the release, as indicated by the information retrieved in block 504, then information on version 2 of software component X, if it exists, will be retrieved in block 506. The information retrieved in block 506 may be any suitable information, such as creation times for each of the next version. Information may be retrieved in block 506 in any suitable manner, including by any suitable API calls or any other suitable information. Table X shows an example of the type of information that may be retrieved in block 506.

TABLE X

| Software Component | Version | Creation Time |
|---|---|---|
| foo.c | 3 | :04 |
| bar.c | 2 | :03 |

In block 508, the information retrieved in block 504 may be compared by the estimation module to the information retrieved in block 506 to estimate a creation time for the release. This comparison may be done in any suitable manner. In some implementations the comparison may estimate a creation time by selecting a time which is the latest of the creation times of the software component versions included in the release which is not later than a creation time of a next version not included in the release. A comparison in accordance with this technique may be carried out in any suitable manner, such as by the exemplary process illustrated in FIG. 6, though it should be appreciated that other techniques may be implemented.

Figure 6:
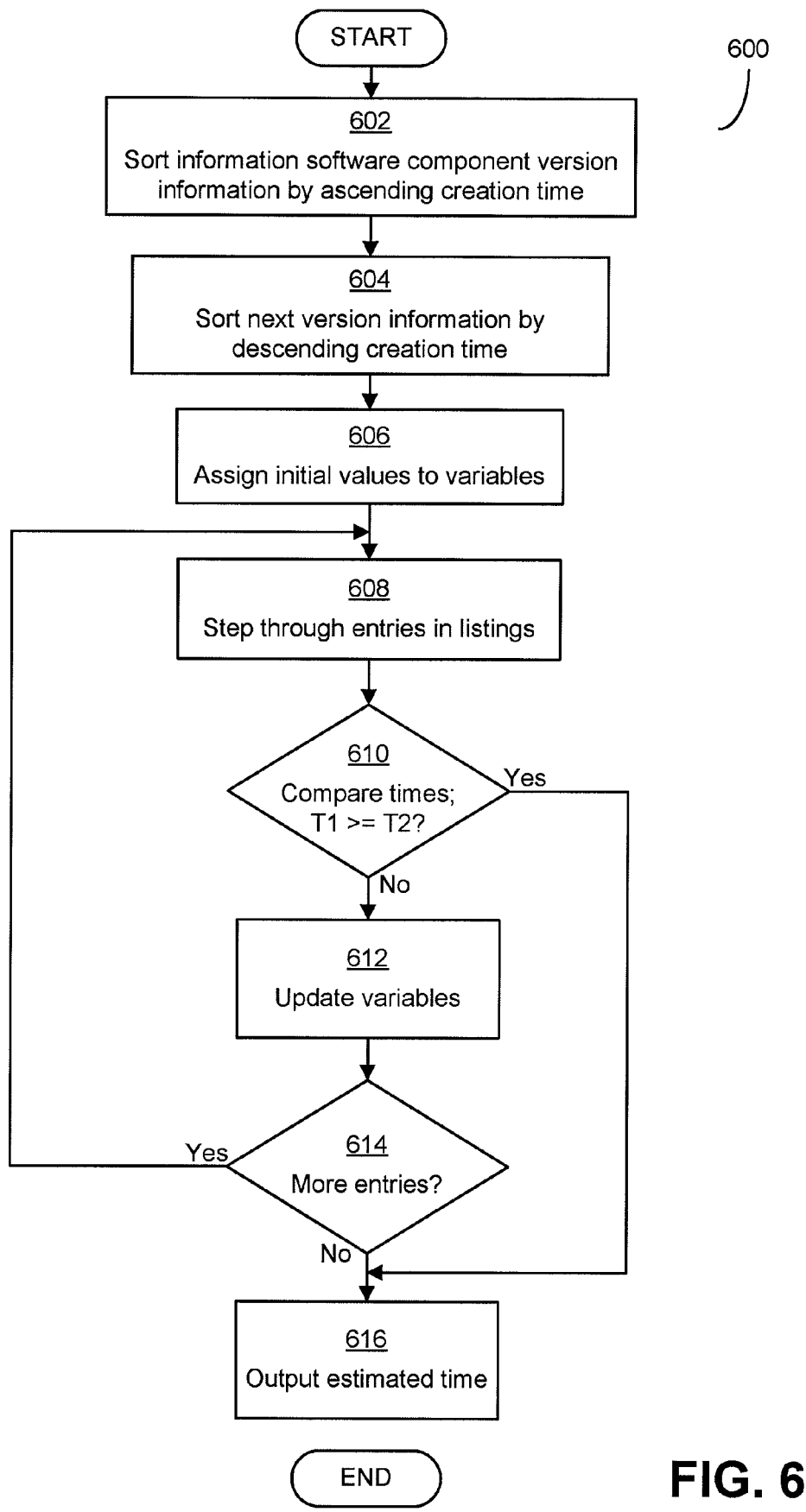
FIG. 6 is a flowchart of an exemplary process for estimating a creation time for a release that may be implemented in accordance with some, but not all, of the principles described herein.

The exemplary process 600 of FIG. 6 (implementing the estimation of block 508) begins in block 602, wherein the estimation module sorts the information retrieved in block 504 according to ascending order of creation times for each of the software component versions. The sort of block 602, operated on the information of Table IX, yields Table XI.

TABLE IX

| Software Component | Version | Label | Creation Time |
|---|---|---|---|
| bar.c | 1 | REL1.1 | :01 |
| foo.c | 2 | REL1.1 | :02 |
| other.c | 3 | REL1.1 | :05 |

In block 604, the estimation module sorts the information retrieved in block 506 according to descending order of creation times for each of the next versions. The sort of block 604, operated on the information of Table X, yields Table XII.

TABLE XII

| Software Component | Version | Creation Time |
|---|---|---|
| foo.c | 3 | :04 |
| bar.c | 2 | :03 |

In block 606, initial values are assigned to variables used by the estimation module. The value of the creation time in the first row of Table XI is set to the variable T1, and the value of the creation time in the first row of Table XII is set to the variable T2. The estimated creation time for the release, the variable basis_time, is set to be T1. Then, in block 608, the estimation module begins stepping through the entries in each of the listings (e.g., the rows of the sorted tables) to identify an estimated creation time for the release. The values of T1 and T2 are compared in block 610. If T1 is greater than or equal to T2 (T1>=T2), then the process is stopped and the estimated creation time is output in block 616. If T1 is less than T2, however, then, in block 612, basis_time is set to the value of T1, and, if the last rows of the tables have not been reached, then T1 and T2 are set to be the creation times in the next rows of the respective tables. In block 614 it is determined whether the end of both tables has been reached and, if not, the process loops back to perform a comparison in block 610. If the end of both tables has been reached then, in block 616, the estimated creation time, basis_time, is output and the process ends. Outputting the estimated creation time may comprise storing the estimated creation time in a computer storage medium, such as in records of the time-based system, sending the estimated creation time to another module or process of the time-based system, outputting the value to a user through a user interface, and/or any other suitable output step.

Using the exemplary data shown in Tables XI and XII, Table XIII shows the values of the variables T1, T2, and basis_time as changed by the illustrative process 600.

TABLE XIII

| T1 | T2 | basis_time |
|---|---|---|
| ~~:01~~ | ~~:04~~ | ~~:01~~ |
| :02 | :03 | :02 |
| :05 | :03 | :02 |

In the example of Tables XI and XII, then, the estimated creation time for the release REL1.1 is time 2 seconds.

It should be appreciated that the process shown in FIG. 6 is merely exemplary of the types of processes that may be implemented to estimate a creation time for a release based on information retrieved from a label-based system, and that any suitable process may be implemented to estimate a creation time in block 508.

In block 510, a data structure is created identifying the release. For example, a time-based stream or snapshot, or other type of version, may be created having as a parent the version from which the release was created. The parent version may be determined in any suitable manner, such as by examining information stored in the records of the label-based system, by examining information stored in the time-based system, or by prompting a user for input regarding the parent version. In some implementations, a setting in the time-based system may specify a parent version for created time-based versions and snapshots, such as a setting that each time-based stream and snapshot will have as a parent version a particular version (e.g., the source version, or other specified version). Such a setting may be particularly useful in cases where the software project of the label-based system has only one branch, such that in the label-based system all releases were created based on the same source. The time-based stream or snapshot may use as a reference time the estimated creation time from block 508, and therefore may, as described above, inherit from the parent version the properties of the parent version (e.g., the contents of the parent version) only through the reference time indicated in the time-based version or snapshot, and therefore the time-based version or snapshot will be an accurate representation of the state of the parent version (i.e., the state of the version of the software project from which the release was created) at the estimated creation time.

In block 512, the estimation module may examine the contents of the release, as determined by the information retrieved in block 504, and compare it to the estimated creation time and the contents of the parent version of the time-based stream or snapshot. This is done to determine whether any exceptions or exclusions should be stored in the time-based stream or snapshot. Any suitable technique may be used to determine exceptions and/or exclusions. For example, to determine exclusions, the estimation module may step through each row in the information retrieved in block 504 (e.g., the Table IX) and determine whether the creation time in the row is later than the estimated creation time. If so, then an exception may be indicated in the time-based stream or snapshot indicating that the software component version in that row is to be explicitly included in the time-based stream or snapshot. As another example, to determine exclusions, the contents of the parent version of the time-based version or snapshot at the estimated creation time are examined and compared to the information retrieved in block 504 (e.g., the Table IX) to determine whether any of the contents of the parent version at the estimated creation time was not included in the release as indicated by the information stored by the label-based system (i.e., the information retrieved in block 504). If it was not included in the release, as indicated by the records of the label-based system, then it should not be included in the release in the records of the time-based stream. If any software components are found to be included which should not be, then an exclusion may be indicated in the time-based stream or snapshot indicating that the software component (or software component version) should not be included.

The exemplary data shown above in Tables XI and XII shows an example of where an exception would be created. As shown in Table XI, version 3 of the software component other.c should be included in the release, but it was not created until time 5 seconds, which is after the estimated creation time for the release (i.e., time 2 seconds). In this case, in block 512 the estimation module will recognize that the creation time for the software component version is after the estimated creation time, and will indicate an exception for version 3 of other.c in the time-based version or snapshot.

Exceptions and exclusions determined and created in block 512 may be stored by the time-based system in any suitable manner. For example, in some implementations, include/exclude rules (I/E rules) are used to note the specific exceptions (inclusions) or exclusions to the time-based version or snapshot. Once exceptions and exclusions are handled in block 512, then the process 500 ends.

It should be appreciated that the process 500 is merely exemplary of the types of techniques that may be implemented in accordance with some of the principles described herein, and that other techniques are possible. For example, in some implementations, an estimation module, instead of storing the record in block 510 as a time-based stream or a snapshot, the estimation module may first determine whether any exceptions/exclusions exist and, if so, may then store the record as a time-based version and, if not, store the record as a snapshot. As a further alternative, the record may be stored as a time-based stream in block 510 and, following the determination of block 512, may convert the time-based stream to a snapshot if there are no exceptions/exclusions to be indicated.

As a further alternative to the process 500, in some implementations a technique may be implemented which does not receive (as in block 502) an indication of a specific release for which information should be retrieved in block 504, but rather retrieves all information regarding all releases and creates records in the time-based system for each of the releases described by the retrieved information. Some implementations may additionally or alternatively be adapted not to retrieve information on one or more releases, but rather to receive as input the information retrieved in block 504 from which releases are created. For example, in one implementation the import module described above may be adapted to retrieve the release information and then provide it to the estimation module.

It should be additionally appreciated that while an estimation module is described as carrying out each of the steps described in FIG. 5, in some implementations an estimation module may only implement some of the steps. For example, an estimation module may only implement the steps described in block 508 of FIG. 5, such as by only executing the exemplary process 600 of FIG. 6. As such, while an estimation module may, in some implementations, be responsible for retrieving information from a label-based system and creating a release in a time-based system, in other implementations an estimation module may be implemented which carries out fewer functions and may, for example, only be responsible for estimating a creation time for the release.

Figure 7A:
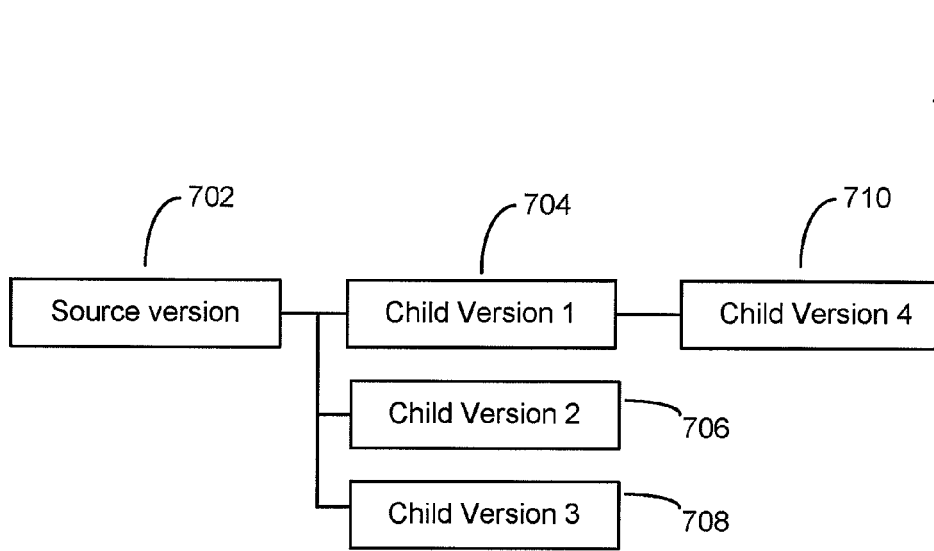
FIGS. 7A and 7B are illustrations of an exemplary version hierarchy before and after operation of an estimation module to create a version in a time-based system.
Figure 7B:
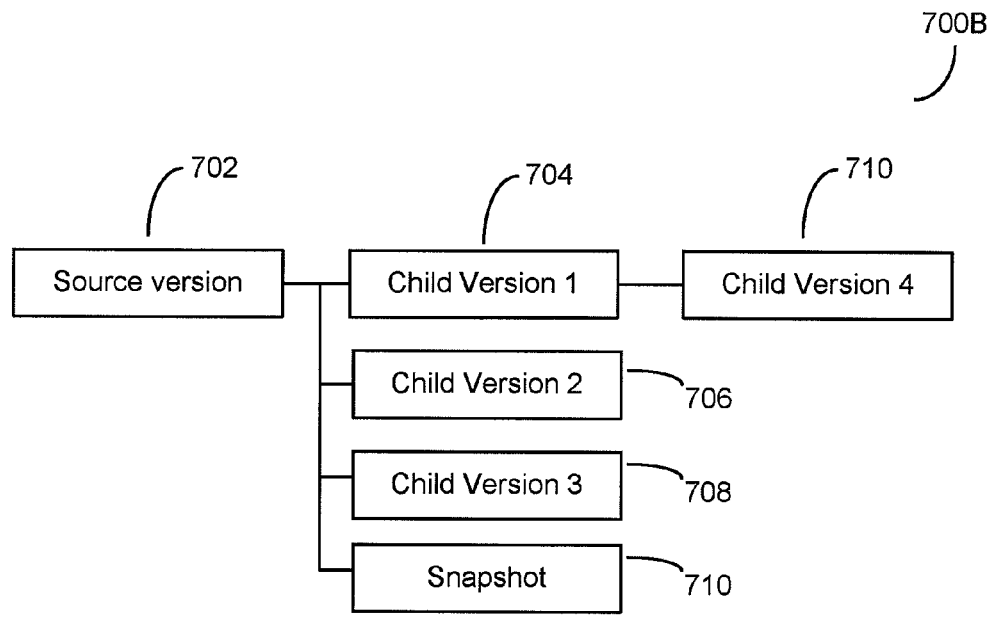

FIGS. 7A and 7B show an exemplary version hierarchy (following the exemplary structure described above in connection with FIG. 2, and possibly, but not necessarily, implemented as a stream hierarchy) before and after the addition of a time-based stream or snapshot. FIG. 7A shows the version hierarchy 700A having been created by any suitable process, such as by a user or by a process such as an import module operating according to the process 400 described in connection with FIG. 4. Version hierarchy 700A has a source version 702 having child versions 702, 704, and 706, and child version 702 has its own child version 708. These versions may be implemented in any suitable manner, including, for example, as streams operating as described above. In FIG. 7B, this hierarchy 700A is edited by an estimation module (e.g., in block 510 of FIG. 5) to yield the version hierarchy 700B, having a snapshot 710. The snapshot 710 has as a parent version the source version 702, and will inherit the properties of source version 702 only through the estimation time determined by the estimation module.

Table XIV shows a historical version hierarchy that may be maintained in the records of a time-based system to identify versions managed by the CM application of the time-based system. The Table XIV shows the information that has been modified by the estimation module to yield the version hierarchy 700B.

TABLE XIV

| Version ID | Version Name | Parent Version | Time Basis | Transaction # |
|---|---|---|---|---|
| 1 | Source Version | 0 | — | 1 |
| 2 | Child Version 1 | 1 | — | 4 |
| 3 | Child Version 2 | 1 | — | 5 |
| 4 | Child Version 3 | 1 | — | 7 |
| 5 | Child Version 4 | 2 | — | 10 |
| 6 | Snapshot | 1 | :02 | 15 |

For each entry, the version ID field may hold a unique identifier for the version, the name field may hold a name of the version identified, the parent version may hold a unique identifier for the parent version of the version, the time basis may hold a time and/or transaction value identifying a time at which the version will stop inheriting properties of its parent version, and the transaction field may hold a transaction number or other value (e.g., time value) corresponding to a time at which the entry was created (e.g., corresponding to a time the version was created). As mentioned above, Table XIV is shown comprising information modified by the estimation module as a result of actions taken that may form a part of block 508 of the illustrative process 500 of FIG. 5. The estimation module will have appended (or caused, through other actions, the time-based system to append) the last row to the table, creating an identifier for the Snapshot version. The transaction executed by the estimation module (or by the time-based system, in response to actions by the estimation module) has been assigned a transaction number 15, and so is stored in the table as an indicator of the actions which resulted in the Snapshot version being created.

Techniques operating to some or all of the principles described herein may be implemented in any suitable manner. For example, in some embodiments, the techniques may be implemented as computer-executable instructions encoded on one or more computer storage media such as a magnetic medium (e.g., a hard disk drive), a Compact Disk (CD), a Digital Versatile Disk (DVD), a persistent or non-persistent solid-state memory (e.g., Flash memory, Magnetic RAM, etc.), or any other suitable storage media. In some such embodiments, the computer-executable instructions implementing the techniques operating in accordance with the principles described herein may be implemented as one or more stand-alone modules (e.g., the import module and the estimation module described above). As used herein, a "module" is a structural component of a system which performs a specific operational role, however instantiated, which may be a portion of or an entire software element (e.g., a function or a discrete process). These modules may, in some implementations, be adapted to interact with other, unrelated modules and/or processes, such as modules implementing a time-based system and a CM application, or, in other implementations, the modules may be adapted to interact with other modules which, together with the modules, form an overall system such as the time-based system. As such, it should be appreciated that, while in some embodiments the techniques described herein may be implemented as a portion of a time-based system, in other embodiments the techniques may be implemented separately from any time-based system and may be adapted to interact with a time-based system. It should also be appreciated that, in many implementations, an estimation module may be implemented separately from an import module, such that an import module may form a portion of a time-based system while an estimation module may be a separate component adapted to interact with the time-based system.

Computer-executable instructions which implement techniques operating according to one or more of the principles described herein may be executed on any suitable computing device operating in any suitable computer system. For example, techniques operating according to some or all of the principles discussed herein may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 8:
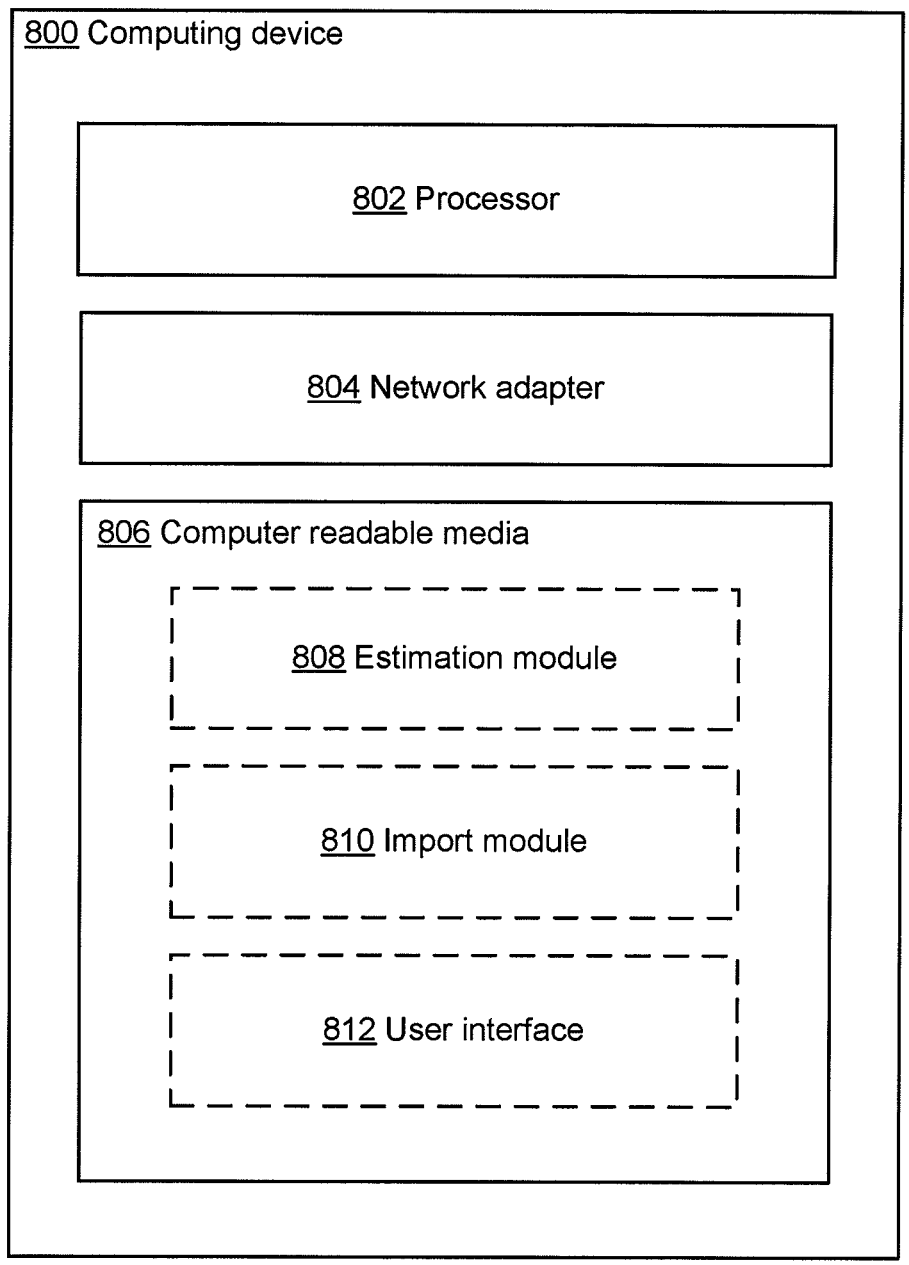
FIG. 8 is a diagram of an exemplary computing device which may implement techniques operating according to some of the principles described herein.

FIG. 8 illustrates one exemplary implementation in the form of a computer apparatus 800 that may be used in a system implementing the techniques described herein, although others are possible. Further, it should be appreciated that FIG. 8 is intended neither to be a depiction of necessary components for a computing device to operate as a computer apparatus, nor a comprehensive depiction.

Computing device 800 may comprise a processor 802, a network adapter 804, and computer-readable media 806. Computing device 800 may be, for example, a desktop or laptop personal computer, a workstation, a server, a mainframe, or any other suitable computing device. Network adapter 804 may be any suitable hardware and/or software to enable the computing device 806 to communicate with any other suitable computing device over any suitable computing network. The computing network may be any suitable wired and/or wireless communication medium or media for exchanging data between two or more computers, including the Internet. Computer-readable media 806 may be adapted to store data to be processed and/or instructions to be executed by processor 802. Processor 2002 enables processing of data and execution of instructions. The data and instructions may be stored on the computer-readable media 806 and may, for example, enable communication between components of the computing device 806.

The data and instructions stored on computer-readable media 806 may comprise computer-executable instructions implementing techniques which operate according to the principles described herein. In the example of FIG. 8, computer-readable media 806 stores computer-executable instructions implementing an estimation module 808 and an import module 810, which may operate according to the exemplary techniques described above. Computer-readable media 806 further comprises a suitable user interface 812, through which a user may be prompted for input (e.g., input of a release to be created, as in block 502 above, and/or input of a parent version for a release, as in block 510 above). In alternative implementations, computer-readable media 806 may solely comprise computer-executable instructions implementing an estimation module. The estimation module and/or import module may be adapted to communicate with a label-based system operating on another computing device over a communication network using the network adapter 804 and may additionally be adapted to communicate with a time-based system operating on a computing device (which may be the same or a different computing device as the one operating the label-based system) over the communication network and through the network adapter 804.

In alternative implementations, rather than communicating with the label-based and time-based systems over a communication network, the computing device 800 may operate the label-based and/or time-based systems and one or both modules may be adapted to communicate with the systems locally. For example, the computer-readable media 806 may further comprise computer-executable instructions implementing a time-based system and a data store of data and metadata stored by the time-based system, and the estimation and import modules may interact with the time-based system locally and interact with the label-based system through the communication network. Alternatively, the estimation and/or import modules may be implemented on the same computing device as the label-based system, and may interact with the time-based system over a communication network. In such an implementation, the computer-readable media 806 may comprise computer-executable instructions implementing the label-based system and a data store of data and metadata stored by the label-based system. As a further alternative, computing device 800 may operate both the label-based and time-based systems and the estimation and/or import modules, and the computer-readable media 806 may further comprise computer-executable instructions implementing the label-based and time-based systems and data stores of data and metadata stored by the systems. As a further alternative, the computing device 800 may not operate the time-based and/or label-based systems, but may instead be adapted to operate one or more client program which interacts with servers operating the label-based and/or time-based systems. In such embodiments, the computer-readable media 806 may further store computer-executable instructions to operate the one or more clients.

Figure 9:
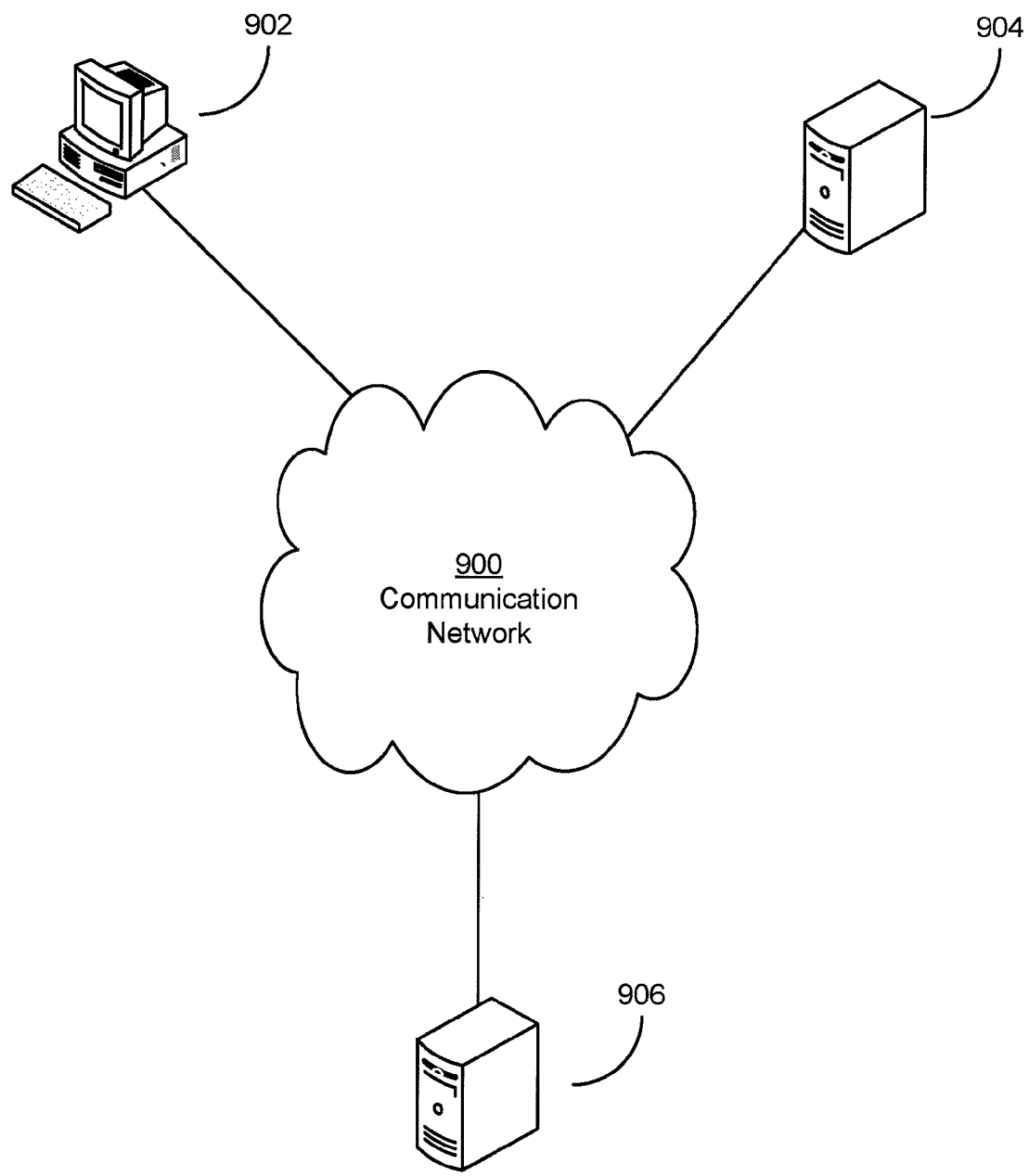
FIG. 9 is a diagram of an exemplary computer system in which techniques operating according to the principles described herein may act.

FIG. 9 shows an example of an exemplary computer system in which techniques operating according to one or more the principles described above may act. In the example of FIG. 9, computing device 902 (which may be implemented according to the exemplary design of computing device 800 of FIG. 8) may operate an estimation module as described above, and may communicate to other computing devices 904 and 906 through a communication network 900. Communication network 900 may be any suitable wired and/or wireless communication medium or media for exchanging data between two or more computers, including an enterprise network or the Internet. For example, the computing network may be, at least in part, a wireless network operating according to any suitable wireless networking protocol, such as IEEE 802.11, GSM, Bluetooth, WiMAX, UWB, and/or any other suitable protocol, or may be, at least in part, a wired network operating according to any suitable wired networking protocol, such as Ethernet. Computing devices 904 and 906 may, respectively, implement a label-based system and a time-based system as described above.

It should be appreciated that the computer system shown in FIG. 9 merely exemplary, as techniques operating according to the principles described herein may operate in any suitable computer system. For example, in one alternative system, as described above, computing devices 902 and 906 may be implemented as a single computing device, such as in the case where the estimation module and/or the import module are implemented on the same computing device as the time-based system. Alternatively, computing devices 902 and 904 may be implemented as a single computing device, or computing devices 904 and 906 as a single device, or all computing devices implemented as a single computing device, according to some of the alternatives described above in connection with FIG. 8. In addition, while the computing devices are shown as personal computers and servers in the example of FIG. 9, it should be appreciated that any of the computing devices may be implemented in any suitable fashion as any suitable device, including as a personal computer, server, mainframe, workstation, rack-mounted computer, personal-digital assistant (PDA), or any other suitable computing device.

Various aspects of the principles described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for estimating a creation time for a version of a software project, the version comprising a plurality of software components and at least some of said software components being available in two or more versions with only one version of a software component being included in a software project version, the method comprising:
  - (A) determining a first set of two or more software component versions and a second set of two or more software component versions, the first set of two or more software component versions comprising versions of software components which are included in the version of the software project and the second set of two or more software component versions comprising later versions of the software components, wherein at least one software component version in the first set is not present in the second set;
  - (B) via at least one processor, examining the creation times of the software component versions of the first set and the second set to determine the creation time for the version of the software project by (B1) comparing the creation times for each software component which has a version in each of the first set and the second set, and (B2) selecting as the estimated creation time for the version of the software project that time which is the latest of the component creation times of versions of software components in the first set of two or more software component versions which is not later than a component creation time of a corresponding version of the software component in the second set of two or more software component versions.

2. The computer-implemented method of claim 1, wherein determining a creation time for the version of the software project further comprises sorting the first set of two or more software component versions and their component creation times into a first set according to an ascending order of component creation times, sorting the second set of two or more software component versions and their component creation times into a second set according to a descending order of component creation times, and iteratively comparing entries in the first set and second set to determine a latest component creation time for a software component version in the first set that is not greater than or equal to the component creation time in the corresponding entry in the second set.

3. The computer-implemented method of claim 2, wherein the entries in the first set and second set compared in the act of iteratively comparing are entries corresponding by location in the first set and the second set.

4. The computer-implemented method of claim 1, further comprising:

(C) determining if there is a first software component in the second set for which a version existed prior to the estimated creation time determined in act (B) and for which a version is not included in the first set of two or more software component versions, and, if so, recording, in a data structure that identifies content of the version of the software project, at least one indication that the first software component is to be excluded from the version of the software project.

5. The computer-implemented method of claim 1 or 4, further comprising:

(C) determining if there is a second software component version included in the version of the software project that was created after the estimated creation time determined in act (B) and, if so, recording, in a data structure that identifies content of the version of the software project, at least one indication that the first software component version is to be included in the version of the software project.

6. The computer-implemented method of claim 1, wherein determining a first set of software component versions and a second set of software component versions in act (A) comprises retrieving information on the first set and second set from records of a label-based software configuration management system.

7. The computer-implemented method of claim 1, further comprising:

(C) recording in a data structure the creation time for the version of the software project determined in act (B).

8. The computer-implemented method of claim 7, wherein the act (C) comprises creating the data structure to represent the version of the software project.

9. The computer-implemented method of claim 7, wherein the data structure is a stream.

10. A computer-implemented method for converting a software project from a label-based system for use in a time-based system and determining which versions of software components to include in a version of the software project in the time-based system, each version of the software project comprising a plurality of said software components in some combination of versions, the method comprising:

(A) examining a first set of software component versions for two or more software components included in the version of the software project and a second set of later versions of the two or more software components to determine component creation times for each of the software component versions in the first set and the second set, wherein at least one software component version in the first set is not present in the second set;

(B) via at least one processor, determining a creation time for the version of the software project by comparing the creation times for each software component which is present in both the first set and the second set;

(C) recording in a data structure the creation time for the version of the software project determined in act (B); and (D) determining if any software component versions included in the version of the software project in the label-based system were created after the creation time determined in act (B) and, if so, recording in the data structure indications that the software component versions so determined are included in the version of the software project.

11. The computer-implemented method of claim 10, wherein determining a creation time for the first version of the software project comprises:

selecting as the estimated creation time for the version of the software project that time which is the latest of the component creation times of versions of software components in the first set of software component versions, the latest of the component creation times being a component creation time for a version of a software component, which is not later than a component creation time of a corresponding version of the software component in the second set of software components.

12. The computer-implemented method of claim 10, wherein determining a creation time for the version of the software project comprises sorting the first set of software components and their component creation times according to an ascending order of component creation times, sorting the second set of software components and their component creation times according to a descending order of component creation times, and iteratively comparing entries in the first set and second set to determine a latest component creation time for a software component in the first set that is not greater than or equal to the component creation time in the corresponding entry in the second set.

13. The computer-implemented method of claim 12, wherein the entries in the first set and second set compared in the act of iteratively comparing are entries corresponding by location in the first set and the second set.

14. The computer-implemented method of claim 10, further comprising:

(E) determining if there are any excluded software components in the label-based system for which one or more versions existed prior to the creation time determined in act (B) and which are not included in the first set of software components, and, if so, recording in the data structure indications that the one or more excluded software components are to be excluded from the version of the software project.

15. The computer-implemented method of claim 10, wherein the act (A) comprises examining records of the label-based system.

16. The computer-implemented method of claim 10, wherein the data structure is a component of the time-based system.

17. The computer-implemented method of claim 10, wherein the data structure is a stream.

18. At least one non-transitory computer storage medium encoded with computer-executable instructions which, when executed, carry out a method for estimating a creation time for a version of a software project, the version comprising a plurality of software components and at least some of said software components being available in two or more versions with only one version of a software component being included in a software project version, the method comprising:
- (A) determining a first set of two or more software component versions and a second set of two or more software component versions, the first set of two or more software component versions comprising versions of software components which are included in the version of the software project and the second set of two or more software component versions comprising later versions of the software components, wherein at least one software component version in the first set is not present in the second set;
- (B) examining the creation times of the software component versions of the first set and the second set to determine the creation time for the version of the software project by
  - (B1) comparing the creation times for each software component which has a version in each of the first set and the second set, and
  - (B2) selecting as the estimated creation time for the version of the software project that time which is the latest of the component creation times of versions of software components in the first set of software component versions which is not later than a component creation time of a corresponding version of the software component in the second set of software component versions.

19. The at least one computer storage medium of claim 18, wherein determining a creation time for the version of the software project further comprises sorting the first set of software component versions and their component creation times into a first set according to an ascending order of component creation times, sorting the second set of software component versions and their component creation times into a second set according to a descending order of component creation times, and iteratively comparing entries in the first set and second set to determine a latest component creation time for a software component version in the first set that is not greater than or equal to the component creation time in the corresponding entry in the second set.

20. The at least one computer storage medium of claim 19, wherein the entries in the first set and second set compared in the act of iteratively comparing are entries corresponding by location in the first set and the second set.

21. The at least one computer storage medium of claim 18, wherein the method further comprises:
- (C) determining if there is a first software component version in the second set for which a version existed prior to the estimated creation time determined in act (B) and for which a version is not included in the first set of software component versions, and, if so, recording, in a data structure that identifies content of the version of the software project, at least one indication that the first software component version is to be excluded from the version of the software project.

22. The at least one computer storage medium of claim 18 or 21, wherein the method further comprises:
- (C) determining if there is a second software component version included in the version of the software project that was created after the estimated creation time determined in act (B) and, if so, recording, in a data structure that identifies content of the version of the software project, at least one indication that the first software component version is to be included in the version of the software project.

23. The at least one computer storage medium of claim 18, wherein determining a first set of software component versions and a second set of software component versions in act (A) comprises retrieving information on the first set and second set from records of a label-based software configuration management system.

24. The at least one computer storage medium of claim 18, wherein the method further comprises:
- (C) recording in a data structure the creation time for the version of the software project determined in act (B).

25. The at least one computer storage medium of claim 24, wherein the act (C) comprises creating the data structure to represent the version of the software project.

26. The at least one computer storage medium of claim 24, wherein the data structure is a stream.

27. At least one non-transitory computer storage medium encoded with computer-executable instructions which, when executed, carry out a method for migrating a software project from a label-based system for use in a time-based system and determining which versions of software components to include in a version of the software project in the time-based system, each version of the software project comprising a plurality of said software components in some combination of versions of the software components, the method comprising:
- (A) examining a first set of software component versions for two or more software components included in the version of the software project and a second set of later versions of the two or more software components to determine component creation times for each of the software component versions in the first set and the second set, wherein at least one software component version in the first set is not present in the second set;
- (B) determining a creation time for the version of the software project by comparing the creation times for each software component which is present in both the first set and the second set;
- (C) recording in a computer-readable data structure the creation time for the version of the software project determined in act (B); and
- (D) determining if any software component versions included in the version of the software project in the label-based system were created after the creation time determined in act (B) and, if so, recording in the data structure indications that the software component versions so determined are included in the version of the software project.

28. The at least one computer storage medium of claim 27, wherein determining a creation time for the first version of the software project comprises:
    selecting as the estimated creation time for the version of the software project that time which is the latest of the component creation times of versions of software components in the first set of software component versions, the latest of the component creation times being a component creation time for a version of a software component, which is not later than a component creation time of a corresponding version of the software component in the second set of software components.

29. The at least one computer storage medium of claim 27, wherein determining a creation time for the version of the software project comprises sorting the first set of software components and their component creation times according to an ascending order of component creation times, sorting the second set of software components and their component creation times according to a descending order of component creation times, and iteratively comparing entries in the first set and second set to determine a latest component creation time for a software component in the first set that is not greater than or equal to the component creation time in the corresponding entry in the second set.

30. The at least one computer storage medium of claim 29, wherein the entries in the first set and second set compared in the act of iteratively comparing are entries corresponding by location in the first set and the second set.

31. The at least one computer storage medium of claim 27, wherein the method further comprises:
(E) determining if there are any excluded software components in the label-based system for which one or more versions existed prior to the creation time determined in act (B) and which are not included in the first set of software components, and, if so, recording in the data structure indications that the one or more excluded software components are to be excluded from the version of the software project.

32. The at least one computer storage medium of claim 27, wherein the act (A) comprises examining records of the label-based system.

33. The at least one computer storage medium of claim 27, wherein the data structure is a component of the time-based system.

34. The at least one computer storage medium of claim 27, wherein the data structure is a stream.

35. An apparatus comprising:
at least one non-transitory computer storage medium encoded with computer-executable instructions which, when executed, carry out a method for estimating a creation time for a version of a software project, the version comprising a plurality of software components and at least some of said software components being available in two or more versions with only one version of a software component being included in a software project version, the method comprising:
(A) determining a first set of two or more software component versions and a second set of two or more software component versions, the first set of two or more software component versions comprising versions of software component versions which are included in the version of the software project and the second set of software components comprising later versions of the software components, wherein at least one software component version in the first set is not present in the second set;
(B) examining the creation times of the software component versions of the first set and the second set to determine the creation time for the version of the software project by
(B1) comparing the creation times for each software component which has a version in each of the first set and the second set, and
(B2) selecting as the estimated creation time for the version of the software project that time which is the latest of the component creation times of versions of software components in the first set of two or more software component versions which is not later than a component creation time of a corresponding version of the software component in the second set of two or more software component versions; and
at least one processor to execute the method.

36. An apparatus comprising:
at least one non-transitory computer storage medium encoded with computer-executable instructions which, when executed, carry out a method for migrating a software project from a label-based system for use in a time-based system and determining which versions of software components to include in a version of the software project in the time-based system, each version of the software project comprising a plurality of said software components in some combination of versions of the software components, the method comprising:
(A) examining a first set of software component versions for two or more software components included in the version of the software project and a second set of later versions of the two or more software components to determine component creation times for each of the software component versions in the first set and the second set, wherein at least one software component version in the first set is not present in the second set;
(B) determining a creation time for the version of the software project by comparing the creation times for each software component which is present in both the first set and the second set;
(C) recording in a data structure the creation time for the version of the software project determined in act (B); and
(D) determining if any software component versions included in the version of the software project in the label-based system were created after the creation time determined in act (B) and, if so, recording in the data structure indications that the software component versions so determined are included in the version of the software project; and
at least one processor to execute the method.

37. An apparatus comprising:
at least one non-transitory computer storage medium encoded with computer-executable instructions which, when executed, carry out a method for migrating a software project from a label-based system for use in a time-based system and determining which versions of software components to include in a version of the software project in the time-based system, each version of the software project comprising a plurality of said software components in some combination of versions of the software components, the method comprising:
(A) examining a first set of software component versions for two or more software components included in the version of the software project and a second set of later versions of the two or more software components included in the version of the software project to determine component creation times for each of the software component versions in the first set and the second set, wherein at least one software component version in the first set is not present in the second set;
(B) recording in a data structure a creation time for the version of the software project; and
(C) determining if any software component versions included in the version of the software project in the label-based system were created after the creation time and, if so, recording in the data structure indications that the software component versions so determined are included in the version of the software project;

at least one processor to execute the method; and means for estimating the creation time for the software project by comparing the creation times for each software component which is present in both the first set and the second set.

* * * * *